US011915559B2

(12) United States Patent
Maya

(10) Patent No.: US 11,915,559 B2
(45) **Date of Patent: *Feb. 27, 2024**

(54) MODIFYING DIGIT SET BY COVERING AND UNCOVERING DIGITS OF DIGIT SET

(71) Applicant: IGT, Las Vegas, NV (US)

(72) Inventor: Darren Maya, Reno, NV (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/054,760

(22) Filed: Nov. 11, 2022

(65) Prior Publication Data

US 2023/0076509 A1 Mar. 9, 2023

Related U.S. Application Data

(63) Continuation of application No. 17/190,060, filed on Mar. 2, 2021, now Pat. No. 11,527,135.

(51) Int. Cl.
*G07F 17/32* (2006.01)
*G07F 17/34* (2006.01)

(52) U.S. Cl.
CPC ...... *G07F 17/3267* (2013.01); *G07F 17/3213* (2013.01); *G07F 17/34* (2013.01)

(58) Field of Classification Search
CPC .. G07F 17/32; G07F 17/3244; G07F 17/3265; G07F 17/3267
See application file for complete search history.

(56) References Cited

U.S. PATENT DOCUMENTS

| | | | | |
|---|---|---|---|---|
| 6,186,894 | B1 * | 2/2001 | Mayeroff | G07F 17/34 463/16 |
| 6,672,960 | B1 | 1/2004 | B-Jensen | |
| 6,971,954 | B2 | 12/2005 | Randall et al. | |
| 7,238,109 | B2 | 7/2007 | McGahn et al. | |
| 7,488,250 | B2 | 2/2009 | Baerlocher et al. | |
| 7,547,252 | B2 | 6/2009 | Peterson et al. | |
| 7,753,784 | B2 | 7/2010 | Baerlocher | |
| 7,914,373 | B2 | 3/2011 | Webb et al. | |
| 8,079,903 | B2 | 12/2011 | Nicely et al. | |
| 8,096,874 | B2 | 1/2012 | Nicely et al. | |
| 8,267,777 | B2 | 9/2012 | Jaffe | |
| 8,357,041 | B1 | 1/2013 | Saunders | |
| 8,672,762 | B1 | 3/2014 | Basallo et al. | |
| 8,777,744 | B2 | 7/2014 | Basallo et al. | |
| 9,251,656 | B2 | 2/2016 | Cuddy et al. | |
| 9,418,510 | B2 | 8/2016 | Baerlocher | |
| 2003/0045348 | A1 | 3/2003 | Palmer et al. | |
| 2004/0082378 | A1 * | 4/2004 | Peterson | G07F 17/32 463/20 |
| 2005/0059459 | A1 | 3/2005 | Dunn et al. | |
| 2005/0101375 | A1 | 5/2005 | Webb et al. | |
| 2016/0203678 | A1 | 7/2016 | Casey et al. | |

* cited by examiner

*Primary Examiner* — Justin L Myhr
(74) *Attorney, Agent, or Firm* — Neal, Gerber & Eisenberg LLP

(57) ABSTRACT

Gaming systems that provide an award digit covering and uncovering feature for a gaming environment, wherein when an award triggering event occurs, the part of the award provided to the player is based on which digits of the award are covered and which digits of the uncovered at the time of the occurrence of the award triggering event.

19 Claims, 12 Drawing Sheets

MODIFYING DIGIT SET BY COVERING AND UNCOVERING DIGITS OF DIGIT SET

PRIORITY

This application is a continuation of, claims priority to and the benefit of U.S. patent application Ser. No. 17/190,060, filed on Mar. 2, 2021, the entire contents of which is incorporated by reference herein.

BACKGROUND

The present disclosure relates to award modification by covering and uncovering digits of the award in a gaming environment. Gaming machines may provide players awards in primary games. Gaming machines generally require the player to place a wager to activate the primary game. The award may be based on the player obtaining a winning symbol or symbol combination and on the amount of the wager. Gaming machines may also provide players awards in secondary games. Gaming machines may also provide players progressive awards in primary or secondary games.

BRIEF SUMMARY

In certain embodiments, the present disclosure relates to a gaming system including among other elements, a processor and a memory device that stores a plurality of instructions, that when executed by the processor, cause the processor to: (a) communicate data that results in a display, by a display device, of a first award comprising multiple digits; (b) communicate data that results in a display, by the display device, of a first lock covering a first one of the digits of the first award; (c) responsive to an occurrence of a first lock movement event, communicate data that results in a display, by the display device, of the first lock uncovering the first one of the digits of the first award and the first lock covering a second one of the digits of the first award; (d) responsive to an occurrence of a first lock removal event, communicate data that results in a display, by the display device, of the first lock uncovering one of the digits of the first award without covering any of the other digits of the first award; and (e) responsive to an occurrence of a first award triggering event associated with a play of a game, communicate data that results in a display, by the display device, of a player award based on the digits of the first award that are not covered by the first lock at a time of the occurrence of the first award triggering event.

In certain other embodiments, the present disclosure relates to a gaming system including among other elements, a processor and a memory device that stores a plurality of instructions, that when executed by the processor, cause the processor to: (a) communicate data that results in a display, by a display device, of a first award and a second award, each of the first award and the second award comprising multiple digits; (b) communicate data that results in a display, by the display device, of a first lock covering a first one of the digits of the first award and a second lock covering a first one of the digits of the second award; (c) responsive to an occurrence of a lock movement event, communicate data that results in a display, by the display device, of at least one of (i) the first lock uncovering the first one of the digits of the first award and the first lock covering a second one of the digits of the first award, and (ii) the second lock uncovering the first one of the digits of the second award and the second lock covering a second one of the digits of the second award; (d) responsive to an occurrence of a lock removal event, communicate data that results in a display, by the display device, of at least one of (i) the first lock uncovering one of the digits of the first award without covering any of the other digits of the first award, and (ii) the second lock uncovering one of the digits of the second award without covering any of the other digits of the second award; and (e) responsive to an occurrence of an award triggering event associated with a play of a game, communicate data that results in a display, by the display device, of a player award based on at least one of (i) the digits of the first award that are not covered by the first lock at a time of the occurrence of the award triggering event, and (i) the digits of the second award that are not covered by the second lock at a time of the occurrence of the award triggering event.

In certain other embodiments, the present disclosure relates to a method of operating a gaming system, the method including: (a) communicating data that results in a display, by a display device, of an award comprising multiple digits; (b) communicating data that results in a display, by the display device, of a lock covering a first one of the digits of the award; (c) responsive to an occurrence of a lock movement event, communicating data that results in a display, by the display device, of the lock uncovering the first one of the digits of the award and the lock covering a second one of the digits of the award; (d) responsive to an occurrence of a lock removal event, communicating data that results in a display, by the display device, of the lock uncovering one of the digits of the award without covering any of the other digits of the award; and (e) responsive to an occurrence of an award triggering event associated with a play of the game, communicating data that results in a display, by the display device, of a player award based on the digits of the award that are not covered by the lock at a time of the occurrence of the award triggering event.

Additional features are described herein, and will be apparent from the following Detailed Description and the figures.

DETAILED DESCRIPTION

Figure 1:
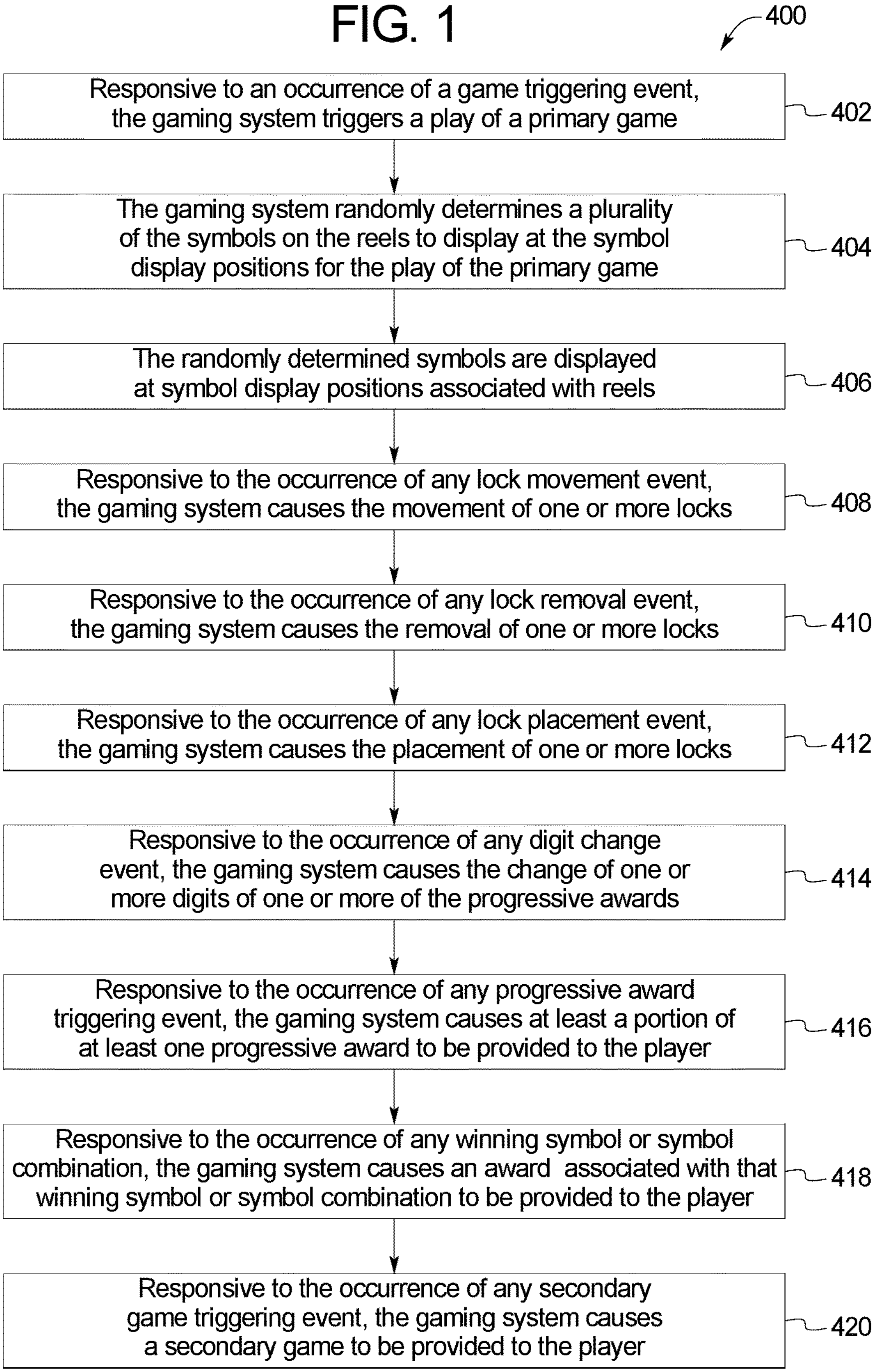
FIG. 1 is a flow chart of an example process for operating one example embodiment of a gaming system of the present disclosure providing plays of a game including award modifications by covering and uncovering digits of the awards based on random determinations.

Various embodiments of the present disclosure relate to a gaming system and method that provides plays of a game including modifications to one or more awards by covering and uncovering digits of the award(s) based on various determinations such as random determinations. For various plays of the game, each award as modified by the covering and uncovering of the digits of that award is available to be won by the player. Thus, in various embodiments of the present disclosure, which awards can be won for or associated with each of a plurality of plays of a game can vary based on which digits of each award are covered and uncovered at the time of the respective award triggering event. Such a configuration of separately randomly determining the awards by covering and uncovering digits of the awards can provide relatively volatile game play based on multiple separate random determinations relative to the covering and uncovering of the digits of the awards.

The gaming system utilized to employ the digit covering and uncovering award modification features may be any suitable electronic gaming machine ("EGM") (such as, but not limited to, a slot machine, a video poker machine, a video lottery terminal, a terminal associated with an electronic table game, a video keno machine, a video bingo machine, or a sporting event wagering terminal), which may provide one or more primary games or secondary games. In various embodiments of the present disclosure, the gaming system causes at least one display device of an EGM to display each play of each game, the awards available to be won, the random determinations of any modifications of the awards available to be won, and the award determinations. In other embodiments, the gaming system can display the awards available to be won and the modifications of the awards available to be won via a display device that is not part of but is associated with (such as above) an EGM.

The first set of example embodiments of the present disclosure described below are directed to example plays of an example primary game, such as an example primary wagering slot game, that includes the digit covering and uncovering award modification features of the present disclosure. The second set of example embodiments described below are directed to example plays of an example secondary game, such as example secondary slot game, that includes the digit covering and uncovering award modification features of the present disclosure. While the example awards are amounts of monetary currency in these various example embodiments described herein, the awards may be other suitable multi-digit awards such as, but not limited to, monetary credits, non-monetary credits, promotional credits, or player tracking points or credits.

Turning now to the Figures, FIGS. 2A, 2B, 2C, and 2D show a display device 50 of a gaming system such as an EGM (not labeled and such as described below) displaying certain parts of example plays of one example embodiment of a primary game 100 implementing the digit covering and uncovering award modification features of the present disclosure. More specifically, FIGS. 2A, 2B, 2C, and 2D show a display device 50 displaying: (1) parts of plays of a primary game 100 including a set of video reels 110, 130, 150, 170, and 190 of the primary game 100; and (2) a set of multiple digit awards and particularly progressive awards 210, 230, 250, and 270 that are winnable by a player in one or more plays of the primary game 100, and that are modified by the digit covering and uncovering features as explained below.

In this example embodiment, the set of multi-digit awards include: (1) a first multi-digit progressive award 210 (referred to as a MAXI progressive award); (2) a second multi-digit progressive award 230 (referred to as a MAJOR progressive award); (3) a third multi-digit progressive award 250 (referred to as a MINOR progressive award); and (4) a fourth multi-digit progressive award 270 (referred to as a MINI progressive award). The quantity of multi-digit awards and the quantity of digits of each multi-digit award may vary in accordance with the present disclosure. Each of these example progressive awards 210, 230, 250, and 270 starts out at an initial amount (not shown) and includes additional amounts (not shown) added to that progressive award based on portions of each wager placed on the plays of the primary game 100 of the gaming system (and also potentially one or more related gaming systems). When a progressive award triggering event occurs (such as in association with a play of the primary game), the gaming system provides at least a portion of one of the progressive awards to the player based on whether any of the digits of that award are covered at the time of progressive award triggering event, as further discussed below. Thus, these amounts of the progressive awards available to be one at any point in time depends on how such awards have been modified by the digit covering and uncovering feature. In certain embodiments, after a progressive award or part thereof is won by a player, the amount of a progressive award is reset to the initial amount.

More specifically, each of the progressive awards includes multiple digits that form that progressive award. In this example embodiment: (1) the first progressive award 210 has 7 digits at 7 digit places (labeled 210*a*, 210*b*, 210*c*, 210*d*, 210*e*, 210*f*, and 210*g*); (2) the second progressive award 230 has 6 digits at 6 digit places (labeled 230*a*, 230*b*, 230*c*, 230*d*, 230*e*, and 230*f*); (3) the third progressive award 250 has 6 digits at 6 digit places (labeled 250*a*, 250*b*, 250*c*, 250*d*, 250*e*, and 250*f*); and (4) the fourth progressive award 270 has 5 digits at 5 digit places (labeled 270*a*, 270*b*, 270*c*, 270*d*, and 270*e*). Thus, each of these progressive awards is a multi-digit award with multiple digit places. In this example embodiment, the digits of each award respectfully represents the dollars and cents of that award. In other embodiments, the digits that represent the cents part of the awards are not employed. In other embodiments, the award are not progressive awards, and thus it should be appreciated that progressive awards are used as examples herein and that such examples are not meant to limit the scope of the present disclosure.

Figure 2A:
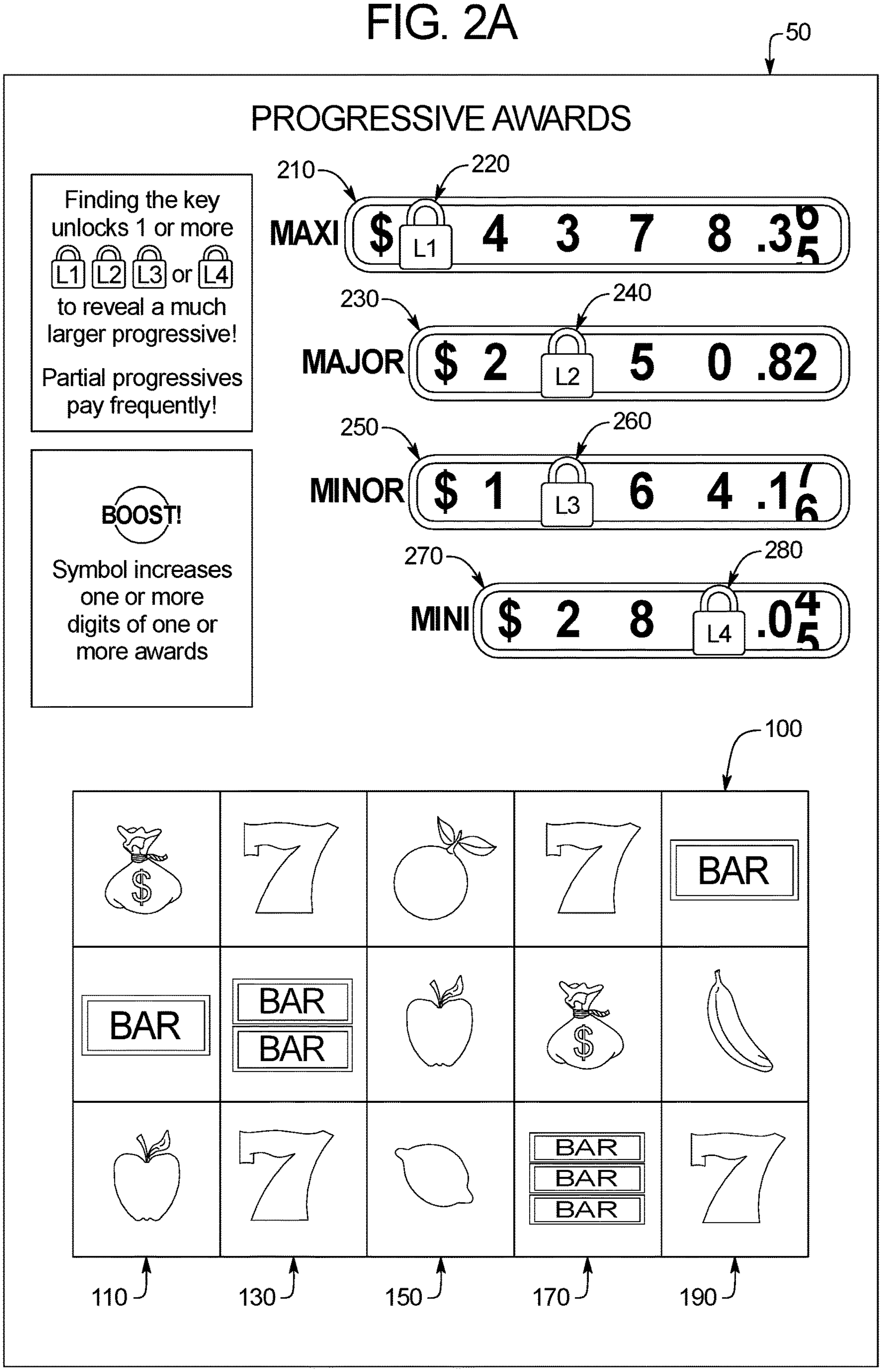
FIGS. 2A, 2B, 2C, and 2D are front views of the displays of one example embodiment of the gaming system of the present disclosure illustrating parts of example plays of a primary game including award modifications by covering and uncovering digits of progressive awards based on random determinations.
Figure 2B:
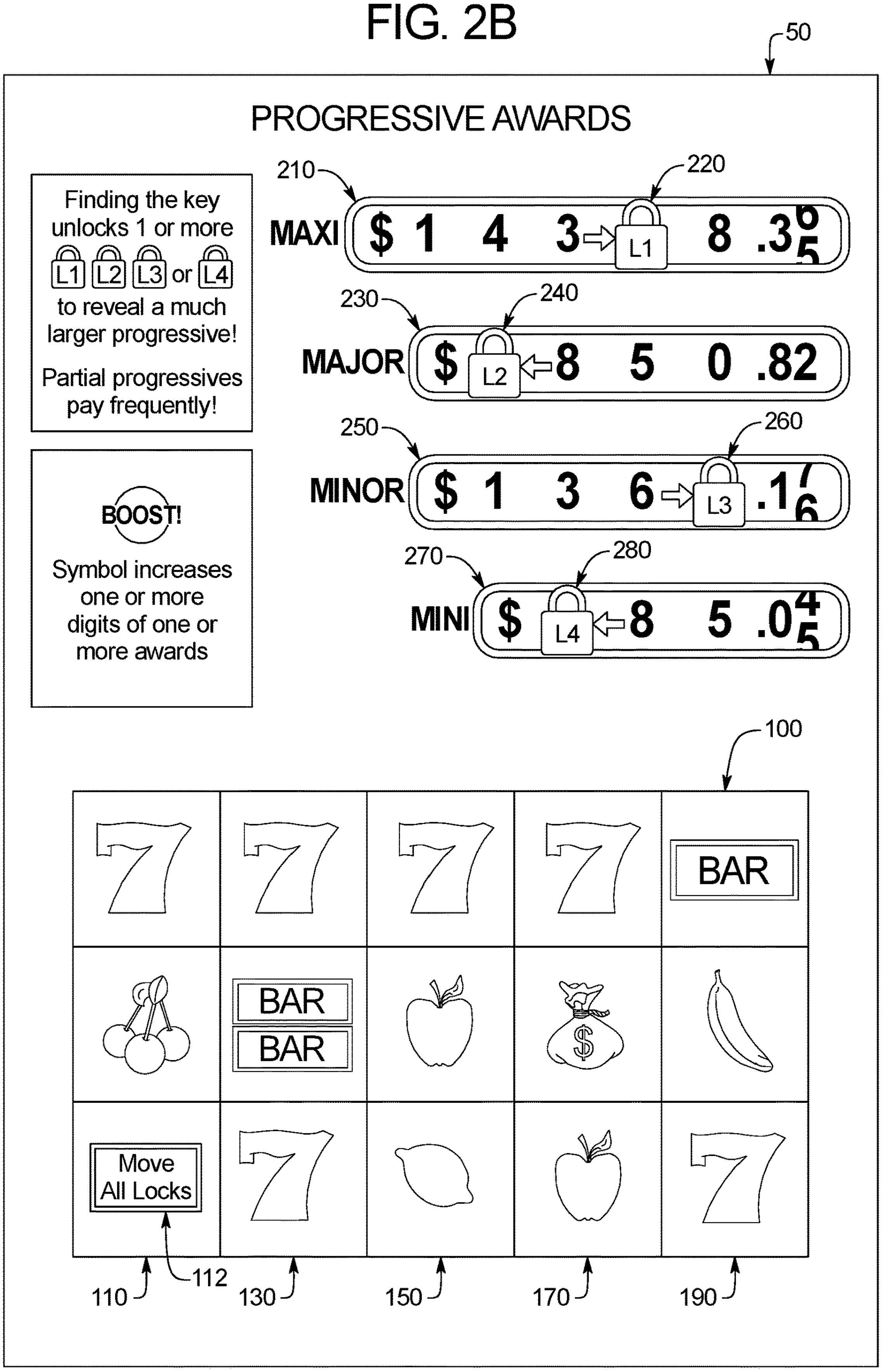
Figure 2C:
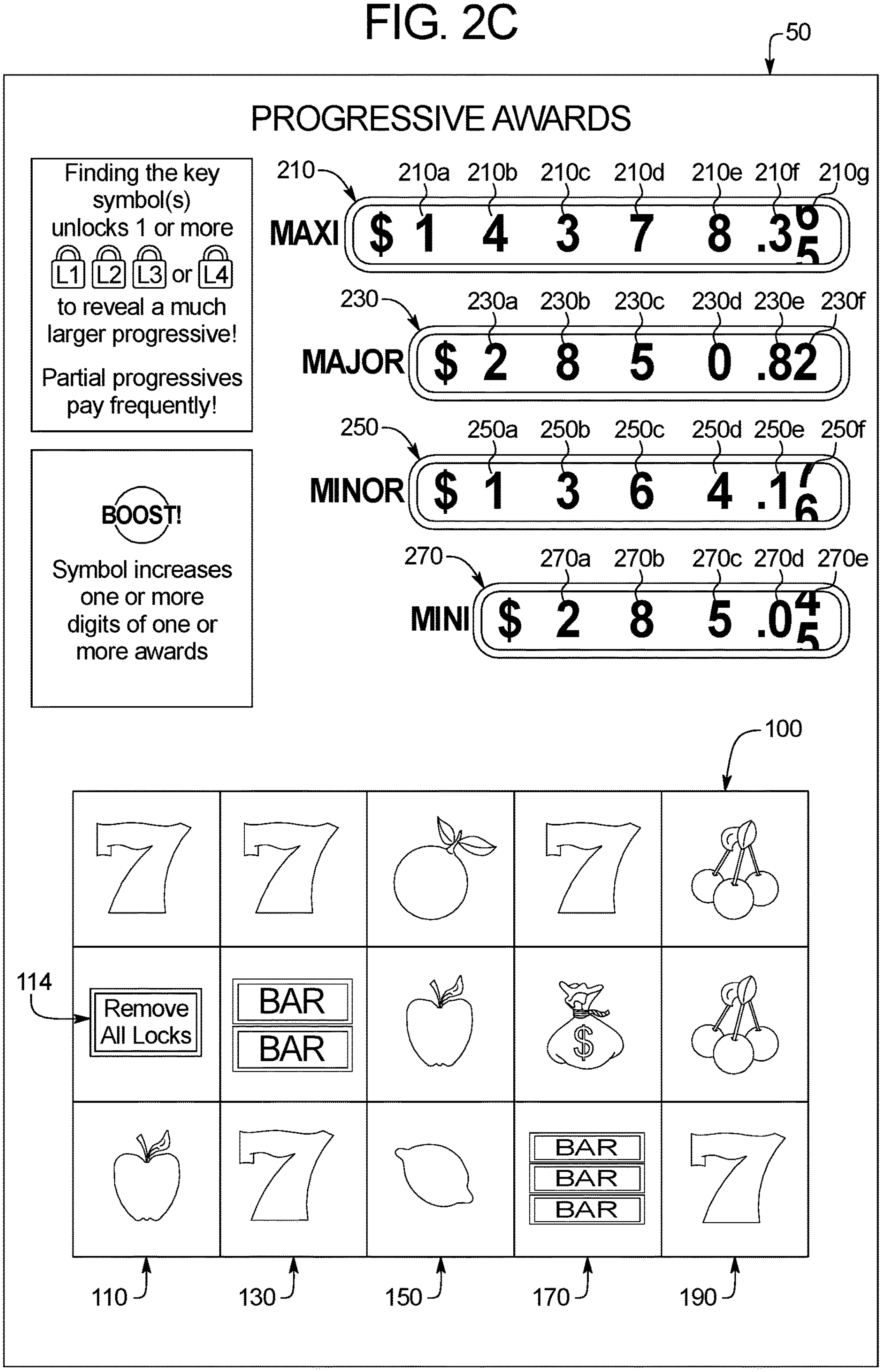
Figure 2D:
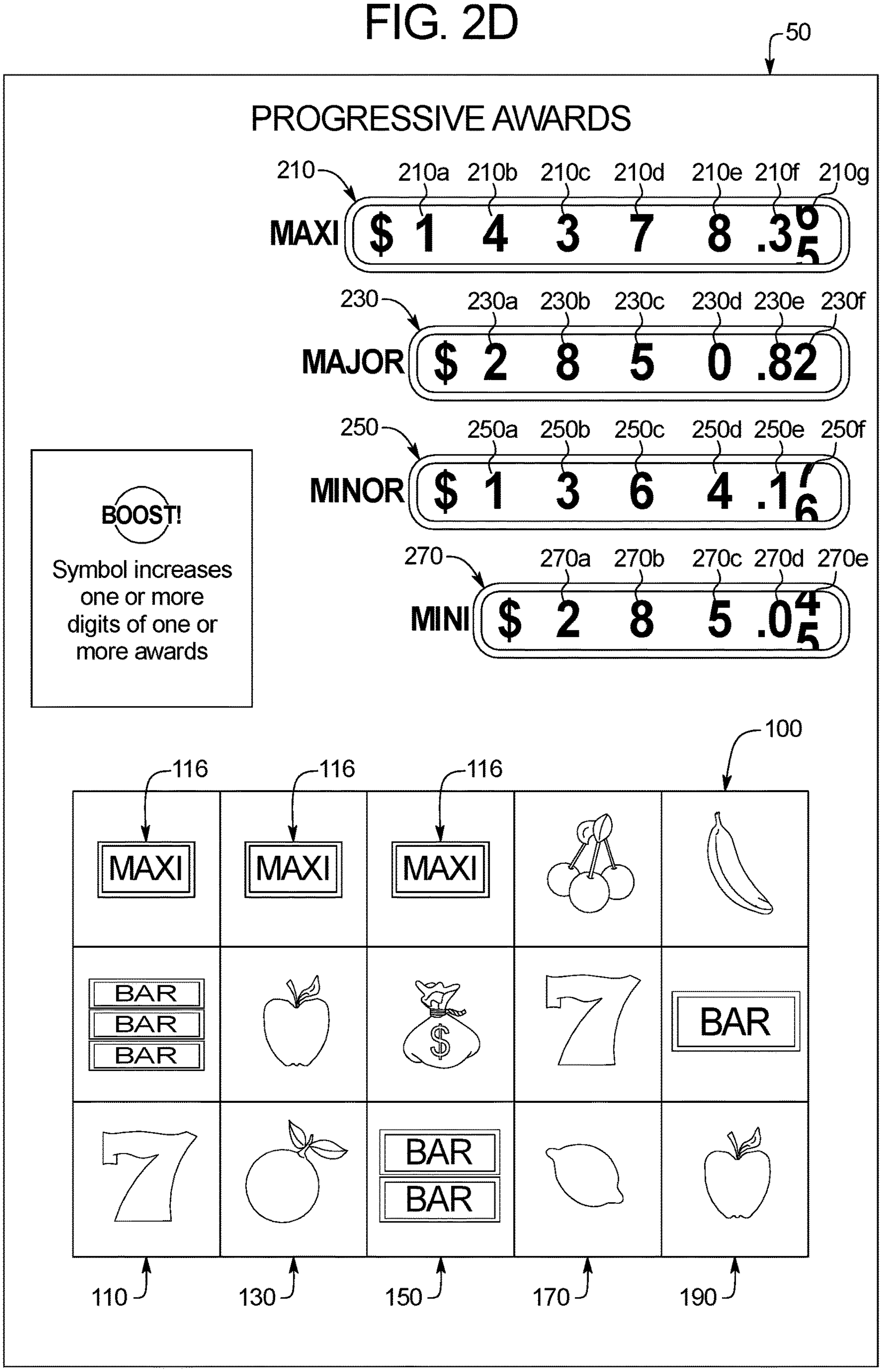

As best shown in FIG. 2D, and as also partly shown in FIGS. 2A, 2B, and 2C, in this example: (1) the first progressive award 210 has as a value of $14,378.36 represented by the 7 digits 1, 4, 3, 7, 8, 3, and 6; (2) the second progressive 230 award has a value of $2,850.82 represented by the 6 digits 2, 8, 5, 0, 8, and 2; (3) the third progressive award 250 has a value of $1,364.17 represented by the 6 digits 1, 3, 6, 4, 1, and 7; and (4) the fourth progressive award 270 has a value of $285.04 represented by the 5 digits 2, 8, 5, 0, and 4. It should be appreciated that one, a plurality of, or all of these progressive awards would be increasing (as somewhat indicated by the respective one cent digits appearing to change) based on wagers made on the gaming system (and related gaming systems, if any, associated with these progressive awards), but for purposes of illustration and simplicity for the examples game plays provided in the present disclosure, these awards are shown at these values for all of the illustrated example game plays. It should also be appreciated that the processor of the gaming system communicates data that results in a display, by a display device 50 of the gaming system, of each of these progressive awards 210, 230, 250, and 270 including the multiple digits of each progressive award, any changes to each progressive award, and any covering of these awards.

FIGS. 2A, 2B, and 2C, also show example digit covering locks and particularly digit covering locks 220 (labeled L1), 240 (labeled L2), 260 (labeled L3), and 280 (labeled L4) respectively associated with the progressive awards 210, 230, 250, and 270. At any one point in time, each of these digit covering locks 220, 240, 260, and 280 is covering or not covering one of the digits of the respective progressive award that the respective digit covering lock is associated with. The respective digit covering locks modify the value of each progressive award that is available to be won by a player at any point in time based on which of digit of that progressive award is covered by the respective lock. In this example embodiment, responsive to the occurrence of one or more lock movement events, one, a plurality of, or each of the locks 220, 240, 260, and 280 is moved by the gaming system to another one of the digit places to cover the digit at that digit place of the respective progressive award. In this example embodiment, responsive to the occurrence of one or more lock removal events, one, a plurality of, or each of the locks 220, 240, 260, and 280 is partially or completely removed by the gaming system from all of the digits of the respective progressive awards. In this example embodiment, responsive to the occurrence of one or more lock placement events, one, a plurality of, or each of the locks 220, 240, 260, and 280 is placed by the gaming system over one or more of the digits of the respective progressive awards. In this example embodiment, responsive to the occurrence of one or digit change events, one, a plurality of, or each of the digits of one, a plurality, or all of the respective progressive awards is/are changed by the gaming system. In this example embodiment, response to an occurrence of a progressive award triggering event occurs, the gaming system provides at least a portion of one, a plurality, or each of the progressive awards to the player, based on which, if any, of the digits of that respective progressive award are covered and not covered by any of the locks at the time of occurrence of that progressive award triggering event.

More specifically, a lock movement event can be any one of a plurality of different events in accordance with the present disclosure. In certain embodiments of the present disclosure, a lock movement event can occur randomly such as based on the occurrence of one or more designated symbols in a play of a primary game or a play of a secondary game. In certain embodiments of the present disclosure, a lock movement event can occur independent of and without regard to the occurrence of one or more designated symbols in a play of a primary game or a play of a secondary game. An occurrence of a lock movement event can cause one or more locks to move. In other words, a lock movement event can be associated with only certain locks (such as one of the locks) or can be associated with multiple locks (such as all of the locks). Likewise, a lock movement event can be associated with only certain awards or can be associated with multiple awards. In certain embodiments of the present disclosure, each lock movement event is associated with a direction of movement of the lock(s) (such as left or right, or higher or lower) and/or a quantity of movements of the lock(s) (such as 1, 2, or 3 digit place movements). In certain embodiments of the present disclosure, each lock movement event is not associated with a direction of movement and the direction of movement of the lock(s) is determined in another suitable manner (such as randomly). In certain embodiments of the present disclosure, each lock movement event is not associated with a quantity of movements and the quantity of movements of the locks(s) is determined in another suitable manner (such as randomly). It should thus be appreciated that the occurrence of a lock movement event causes a modification of one or more of the awards (such as the example progressive awards) that are available to be won by the player after the occurrence of such event.

A lock removal event can be any one of a plurality of different events in accordance with the present disclosure. In certain embodiments of the present disclosure, a lock removal event can occur randomly such as based on the occurrence of one or more designated symbols (such as but not limited to "key-type" symbols) in a play of a primary game or a play of a secondary game. In certain embodiments of the present disclosure, a lock removal event can occur independent of and without regard to the occurrence of one or more designated symbols in a play of a primary game or a play of a secondary game. An occurrence of a lock removal event can cause one or more locks to be removed. In other words, a lock removal event can be associated with only certain locks (such as one of the locks) or can be associated with multiple locks (such as all of the locks). Likewise, a lock removal event can be associated with only certain awards or can be associated with multiple awards. In certain embodiments of the present disclosure, a lock removal event causes one or more locks to be removed until a lock placement event occurs. In certain embodiments of the present disclosure, a lock removal event causes one or more locks to be removed for a designated period of time. In such embodiments, the end of the designated period of time can function as the lock placement event. In certain embodiments of the present disclosure, a lock removal event causes the one or more locks to be removed for a designated quantity of plays of a game. In such embodiments, the quantity of plays reaching the designated quantity can function as the lock placement event. In certain embodiments of the present disclosure, a lock removal event causes one or more locks to be removed until one of the awards are won by a player. In such embodiments, the winning of one of the awards functions as the lock placement event. It should be appreciated that the occurrence of a lock removal event is expected to be a highly desirable event for a player because it would make the values of the respective awards totally available to be won. It should thus be appreciated that the occurrence of a lock removal event causes a modification of one or more of the awards (such as the example progressive awards) that are available to be won by the player after the occurrence of such event.

A lock placement event can be any one of a plurality of different events in accordance with the present disclosure. In certain embodiments of the present disclosure, a lock placement event can occur randomly such as based on the occurrence of one or more designated symbols in a play of a primary game or a play of a secondary game. In certain embodiments of the present disclosure, a lock placement event can occur independent of and without regard to the occurrence of one or more designated symbols in a play of a primary game or a play of a secondary game. An occurrence of a lock placement event can cause one or more locks to be placed over one or more digits of the awards. In other words, a lock placement event can be associated with only certain locks (such as one of the locks) or can be associated with multiple locks (such as all of the locks). Likewise, a lock placement event can be associated with only certain awards or can be associated with multiple awards. In certain embodiments of the present disclosure, a lock placement event causes one or more locks to be placed for a designated period of time. In such embodiments, the end of the designated period of time can function as the lock removal event. In certain embodiments of the present disclosure, a lock placement event causes the one or more locks to be placed for a designated quantity of plays of a game. In such embodiments, the quantity of plays reaching the designated quantity can function as the lock removal event. In certain embodiments of the present disclosure, a lock placement event causes one or more locks to be placed until one of the awards are won by a player. In such embodiments, the winning of one of the awards functions as the lock removal event. In certain embodiments, the gaming system prevents one or more of the locks from covering for a period or forever one or more of the digits of one or more of the awards. It should thus be appreciated that the occurrence of a lock placement event causes a modification of one or more of the awards (such as the example progressive awards) that are available to be won by the player after the occurrence of such event.

A digit change event can be any one of a plurality of different events in accordance with the present disclosure. In certain embodiments of the present disclosure, a digit change event can occur randomly such as based on the occurrence of one or more designated symbols (such as but not limited to the example "Boost" symbols on the reels and as indicated in FIGS. 2A, 2B, 2C, 2D, 3A, 3B, and 3C) in a play of a primary game or a play of a secondary game. In certain embodiments of the present disclosure, a digit change event can occur independent of and without regard to the occurrence of one or more designated symbols in a play of a primary game or a play of a secondary game. An occurrence of a digit change event can cause one or more of the digits of one of more of the awards to change. In other words, a digit change event can be associated with only uncovered digits, or can be associated with covered or uncovered digits, or can be associated with only covered digits. Likewise, a digit change event can be associated with only certain awards or can be associated with multiple awards. In certain embodiments of the present disclosure, a digit change event causes one or more digits to increase. It should be appreciated that the digit change event is expected to be a highly desirable event for the player because it would make the values of the respective awards greater, assuming that the digit change event causes an increase in the respective digit. It should thus be appreciated that the occurrence of a digit change event causes a modification of one or more of the awards (such as the example progressive awards) that are available to be won by the player after the occurrence of such event.

An award triggering event such as a progressive award triggering event can be any one of a plurality of different events in accordance with the present disclosure. In certain embodiments of the present disclosure, a progressive award triggering event can occur randomly such as based on the occurrence of one or more designated symbols in a play of a primary game or a play of a secondary game. In certain embodiments of the present disclosure, a progressive award triggering event can occur independent of and without regard to the occurrence of one or more designated symbols in a play of a primary game or a play of a secondary game. An occurrence of a progressive award triggering event can cause one or more of the progressive awards to be provided to the player. In other words, a progressive award triggering event can be associated with only certain of the progressive awards (such as one of the progressive awards) or can be associated with multiple progressive award (such as all of the progressive awards). For example, the game can have five progressive award triggering events including: (1) a first progressive award triggering event that causes at least part of the first progressive award 210 to be provided to the player; (2) a second progressive award triggering event that causes at least part of the second progressive award 230 to be provided to the player; (3) a third progressive award triggering event that causes at least part of the third progressive award 250 to be provided to the player; (4) a fourth progressive award triggering event that causes at least part of the fourth progressive award 270 to be provided to the player; and (5) a fifth progressive award triggering event that causes at least parts of each of the first, second, third, and fourth progressive awards 210, 230, 250, and 270 to be provided to the player.

When a progressive award is won by a player (based on an occurrence of the respective progressive award triggering event) and no locks cover any of the digits of that progressive award, the player wins the entire value of the progressive award based on all of the digits of that progressive award. When a progressive award is won by a player (based on an occurrence of the respective progressive award triggering event) and a lock covers one of the digits of that progressive award (i.e., the progressive award is modified by the lock), the player wins part of the value of that progressive award based on which of the digits of that progressive award is/are covered and which of the digits of the progressive award is/are uncovered.

In certain embodiments of the present disclosure, the lock covering a digit can function to completely remove the covered digit of the progressive award for award determination purposes. For example, as shown in FIG. 2A, the lock 220 covers the first digit 1 of the first progressive award 210, and if this progressive award is won, the player is provided an award of value of $4,378.36 represented by the 6 uncovered digits 4, 3, 7, 8, 3, and 6 (instead of the full value of this progressive award of $14,378.36). Also, for example, as shown in FIG. 2A, the lock 240 covers the second digit 8 of the second progressive award 230, and if this progressive award is won, the player is provided an award of value of $250.82 represented by the 5 uncovered digits 2, 5, 0, 8, and 2 (instead of the full value of the progressive award of $2,850.82). The awards won are thus modified from their total possible values.

In certain alternative embodiments of the present disclosure, the lock covering a digit can function as a designated digit (such as zero) and the lock simply functions to replace the covered digit of the progressive award with that designated digit. For example, as shown in FIG. 2A, the lock 220 covers the first digit 1 of the first progressive award 210, and if this progressive award is won, the player is provided an award of value of $4,378.36 represented by the 6 uncovered digits 4, 3, 7, 8, 3, and 6 (instead of the full value of this progressive award of $14,378.36). Also, for example, as shown in FIG. 2A, the lock 240 covers the second digit 8 of the second progressive award 230, and if this progressive award is won, the player is provided an award of value of $ $2050.82 represented by lock functioning as a zero digit and the 5 uncovered digits 2, 5, 0, 8, and 2 (instead of the full value of the progressive award of $2,850.82). The awards won are thus modified from their total possible values.

In the illustrated example embodiments, each lock 220, 240, 260, and 280 only covers one digit of any one progressive award at any one time. In alternative embodiments, one or more of the locks can cover more than one digit of one or more progressive awards. For example, one of the locks may cover two digits of one progressive award at any one time.

Turning now back to FIG. 1 and FIGS. 2A, 2B, 2C, and 2D, FIG. 1 is a flowchart of an example method of operating the gaming system of the present disclosure. In various embodiments, the method is represented by a set of instructions stored in one or more memories and executed by one or more processors. Although the method 400 is described with reference to the flowchart shown in FIG. 1, many other processes of performing the acts associated with this illustrated process may be employed. For example, the order of certain of the illustrated blocks or diamonds may be changed, certain of the illustrated blocks or diamonds may be optional, or certain of the illustrated blocks or diamonds may not be employed. FIGS. 2A, 2B, 2C, and 2D are front views of a display device of an example gaming system showing parts of example plays of one embodiment of a primary game of the present disclosure implementing the digit covering and uncovering feature of the present disclosure.

In this example embodiment, responsive to an occurrence of a game triggering event, the gaming system triggers a play of a primary game, as indicated in block 402 of FIG. 1. In this example embodiment, the primary game 100 includes a wagering slot game wherein the game triggering event includes the placement of a wager on the play of the primary game. The game triggering event can be another suitable event in accordance with the present disclosure. The primary game 100 include a plurality of reels 110, 130, 150, 170, and 190 and a plurality of symbols (not labeled) on the reels 110, 130, 150, 170, and 190. In this example embodiment, the symbols on the reels 110, 130, 150, 170, and 190 include, among various other symbols: (1) at least one Move All Locks symbol 112 as shown in FIG. 2B which, when generated functions as a lock movement event; (2) at least one key or Remove All Locks symbol 114 as shown in FIG. 2C which, when generated functions as a lock movement event; (3) a Place Locks Symbol (not shown) which, when generated functions as a lock placement event; (4) a Boost Symbol (not shown) which, when generated functions as a digit change event; and (5) a plurality of sets of progressive award winning symbols (such as MAXI symbols 116), which when generated function as a respective progressive award triggering event.

The gaming system randomly determines a plurality of the symbols on the reels to display at the symbol display positions for the play of the primary game, as indicated in block 404 of FIG. 1.

The randomly determined symbols are displayed at symbol display positions (not labeled) associated with reels 110, 130, 150, 170, and 190, as indicated in block 406 of FIG. 1, and as shown in FIG. 2A.

For this play of the primary game, responsive to the occurrence of any lock movement event, the gaming system causes the movement of one or more locks, as indicated by block 408.

For this play of the primary game, responsive to the occurrence of any lock removal event, the gaming system causes the removal of one or more locks, as indicated by block 410.

For this play of the primary game, responsive to the occurrence of any lock placement event, the gaming system causes the placement of one or more locks, as indicated by block 412.

For this play of the primary game, responsive to the occurrence of any digit change event, the gaming system causes the change of one or more digits of one or more of the progressive awards, as indicated by block 414.

For this play of the primary game, responsive to the occurrence of any progressive award triggering event, the gaming system causes at least a portion of at least one progressive award to be provided to the player, as indicated by block 416.

For this play of the primary game, responsive to the occurrence of any winning symbol or symbol combination, the gaming system causes an award associated with that winning symbol or symbol combination to be provided to the player, as indicated by block 418.

For this play of the primary game, responsive to the occurrence of any secondary game triggering event, the gaming system causes a secondary game to be provided to the player, as indicated by block 420.

FIG. 2A shows the results of a first example play of the primary game. Since no event or triggering symbols, and no winning symbols or winning symbol combinations occurred in this play of the primary game, the play of the primary game does not result in: (a) any changes to the positions of the locks 220, 240, 260, or 280 on the progressive awards 210, 230, 250, or 270; (b) any removal of any of the locks 220, 240, 260, or 280 from any of the progressive awards 210, 230, 250, or 270; (c) any additional locks placed on any of the digits of any of the progressive awards 210, 230, 250, or 270; (d) any changes of any of the digits of any of the progressive awards 210, 230, 250, or 270; (e) any parts of any of the progressive awards 210, 230, 250, and 270 provided to the player; or (f) any other awards provided to the player.

FIG. 2B shows the results of a second example play of the primary game. Since a lock movement event in the form of the Move All Locks symbol 112 on reel 110 occurred in this play of the primary game, the gaming system has moved all of the locks 220, 240, 260, or 280 on the progressive awards 210, 230, 250, or 270. More specifically, (i) the lock 220 has moved three digits to the right on progressive award 210, (ii) the lock 240 has moved one digit to the left on progressive award 230, (iii) the lock 260 has moved two digits to the right on progressive award 250, and (vi) the lock 280 has moved two digits to the left on progressive award 270. Thus, one of the digits of each of these progressive awards has been uncovered and one of the digits of each of these progressive awards has been covered. All of the progressive awards 210, 230, 250, or 270 or parts thereof that are winnable by the player have been modified. Additionally, since the 7-7-7 winning symbol combination has occurred, the gaming system has provided the player an award (not shown) associated with this winning symbol combination. Since no other event or triggering symbols, and no other winning symbols or winning symbol combinations occurred in this play of the primary game, this play of the primary game does not result in: (a) any removal of any of the locks 220, 240, 260, or 280; (b) any additional locks placed on any of the digits of any of the progressive awards 210, 230, 250, or 270; (c) any of the digits of any of the progressive awards changed; or (d) any parts of any of the progressive awards 210, 230, 250, and 270 provided to the player.

FIG. 2C shows the results of a third example play of the primary game. Since a lock removal event (in the form of the "Remove All Locks" symbol 114) occurred in this play of the primary game, the locks 220, 240, 260, or 280 have all been removed from all of the progressive awards 210, 230, 250, or 270. Since no event or triggering symbols, and no winning symbols or winning symbol combinations occurred in this play of the primary game, the play of the primary game does not result in: (a) any additional locks placed on any of the digits of any of the progressive awards 210, 230, 250, or 270; (b) any changes to any of the digits of any of the progressive awards 210, 230, 250, or 270; (c) any parts of any of the progressive awards 210, 230, 250, and 270 provided to the player; or (d) any other awards provided to the player.

FIG. 2D shows the results of a fourth example play of the primary game. For this example play, the locks 220, 240, 260, or 280 have all remained removed from the progressive awards 210, 230, 250, or 270, and since the MAXI-MAXI-MAXI winning symbol combination has occurred, the gaming system has provided the player MAXI progressive award of $14,378.36. Since no other event or triggering symbols, and no other winning symbols or winning symbol combinations occurred in this play of the primary game, this play of the primary game does not result in: (a) any additional locks placed on any of the digits of any of the progressive awards 210, 230, 250, or 270; (b) any changes to any of the digits of any of the progressive awards 210, 230, 250, or 270 except for a reset (not shown) of the MAXI award is provided to the player. It should be appreciated that the full amount of the progressive award 210 is paid to the player because all of the digits of the MAXI progressive award 210 were uncovered at the time of the occurrence of this progressive award triggering event.

Figure 3A:
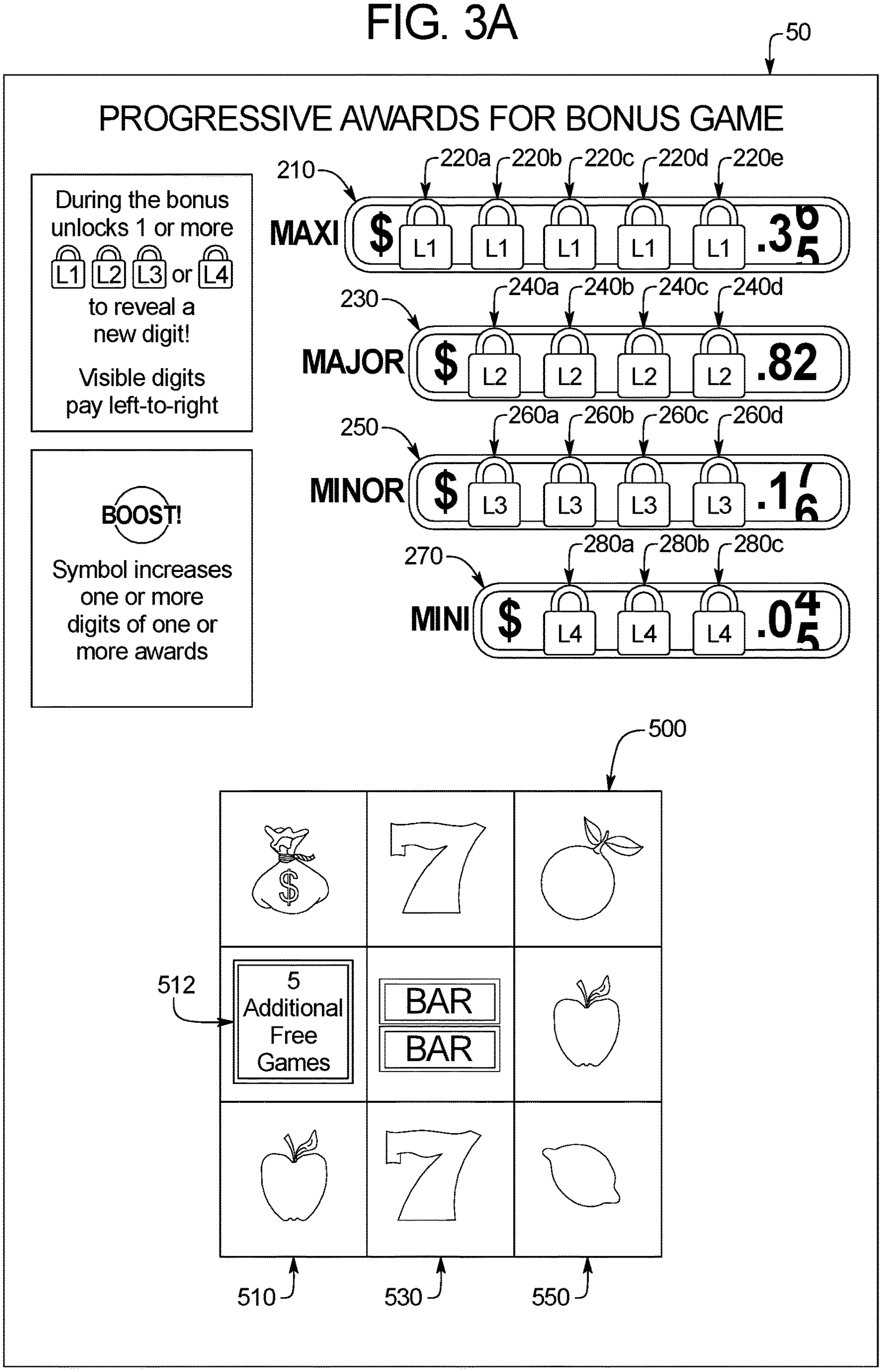
FIGS. 3A, 3B, and 3C are front views of the displays of one example embodiment of the gaming system of the present disclosure illustrating parts of example plays of a secondary game including award modifications by covering and uncovering digits of progressive awards based on random determinations.
Figure 3B:
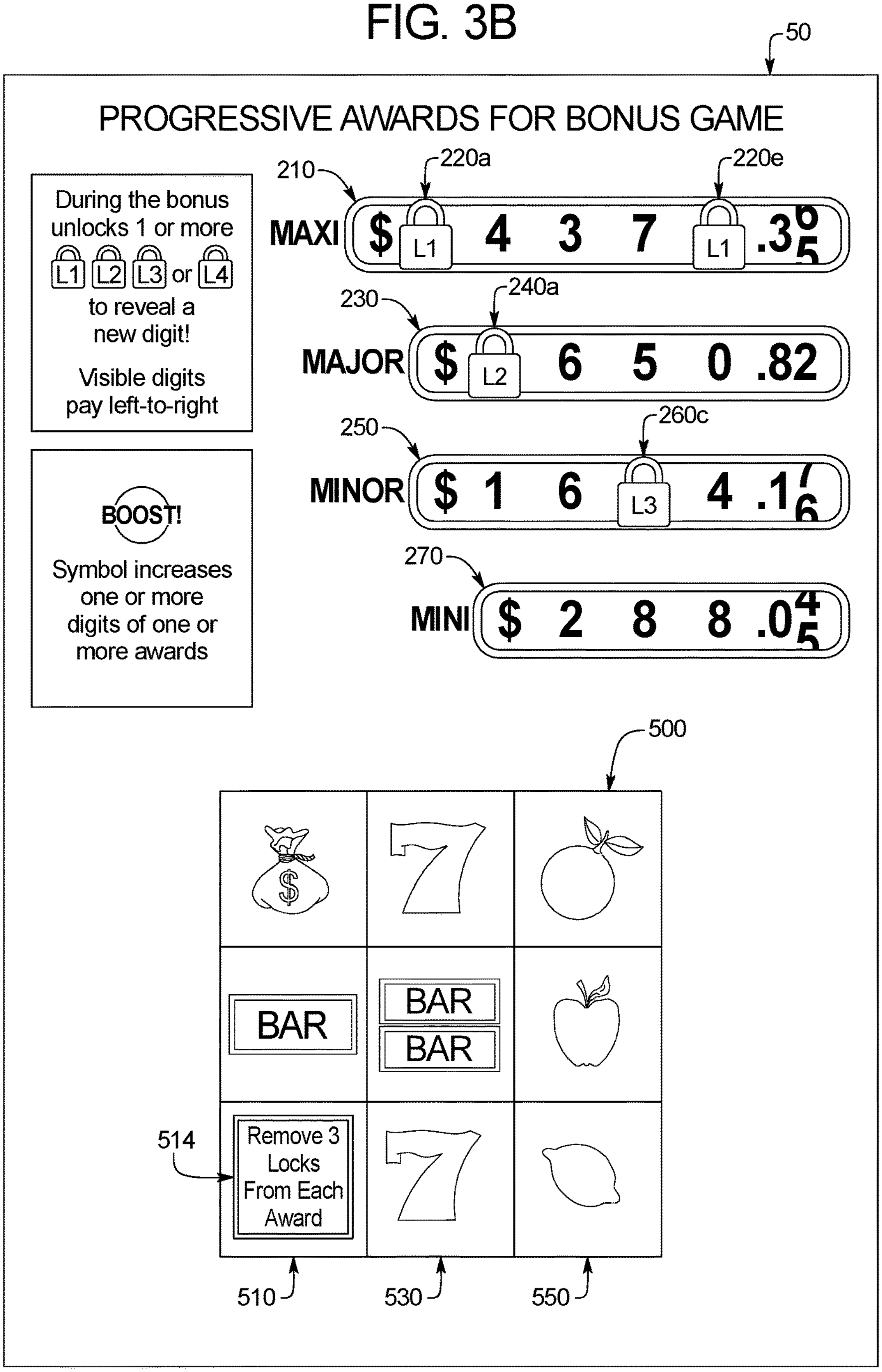
Figure 3C:
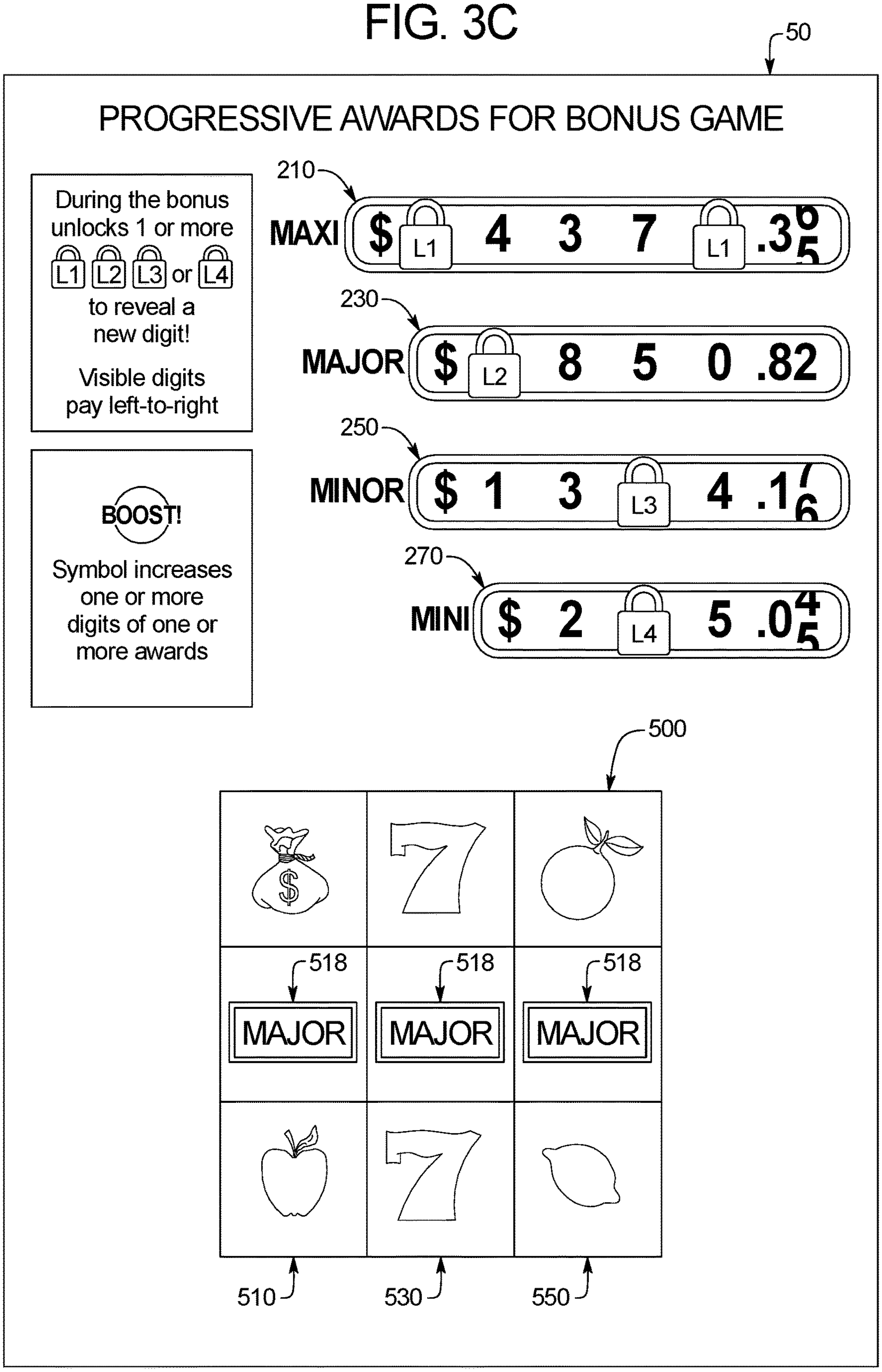

Turning now to FIGS. 3A, 3B, and 3C, front views of a display device of a gaming system show parts of example plays of one embodiment of a secondary game of the present disclosure implementing the digit covering and uncovering feature of the present disclosure. In this example embodiment, responsive to an occurrence of a secondary game triggering event, the gaming system triggers a series of free plays of a secondary game 500. In this example embodiment, the secondary game 500 is slot game that is different than the primary game. It should thus be appreciated that the primary and secondary games may be the same or may be different in accordance with the present disclosure. The secondary game 500 include a plurality of reels 510, 530, and 550 and a plurality of symbols (not labeled on the reels 510, 530, and 550). In this example embodiment, the symbols on the reels 510, 530, and 550 include, among various other symbols: (1) at least one Move All Locks symbol (not shown) which, when generated functions as a lock movement event; (2) at least one key or Remove All Locks symbol (such as the Remove 3 Locks For Each Award symbol 514 as shown in FIG. 3B) which, when generated functions as a lock movement event; (3) a Place Locks Symbol (not shown) which, when generated functions as a lock placement event; (4) a Boost Symbol (not shown) which, when generated functions as a digit change event; and (5) a plurality of sets of progressive award winning symbols (such as MAJOR symbols 518 shown in FIG. 3C), which when generated function as respective progressive award triggering events.

In this example secondary game, all of the digits of all of the progressive awards are initially covered by respective locks. FIGS. 3A, 3B, and 3C, also show example digit covering locks and particularly digit covering locks 220*a*, 220*b*, 220*c*, 220*d*, and 220*e* (all labeled L1), 240*a*, 240*b*, 240*c*, and 240*d* (all labeled L2), 260*a*, 260*b*, 260*c*, and 260*d* (all labeled L3), and 280*a*, 280*b*, and 280*c* (all labeled L4) respectively associated with the progressive awards 220, 240, 260, and 280.

FIG. 3A shows the results of a first example play of the secondary game. Since the FIVE ADDITIONAL FREE GAMES symbol 512 has occurred, the gaming system has provided the player an award (not shown) of five additional free plays of the secondary game. Since no other event or triggering symbols, and no other winning symbols or winning symbol combinations occurred in this play of the secondary game, the play of the secondary game does not result in: (a) any changes to the positions of any of the locks on the progressive awards 220, 240, 260, and 280; (b) any removal of any of the locks from the progressive awards 220, 240, 260, and 280; (c) any changes to any of the digits of any of the progressive awards 220, 240, 260, and 280; or (d) any parts of any of the progressive awards 210, 230, 250, and 270 provided to the player.

FIG. 3B shows the results of a second example play of the secondary game. Since a lock removal event occurred (in the form of the Remove 3 Locks From Each Award symbol 514) in this play of the secondary game, the gaming system has removed 3 locks from each of the progressive awards 220, 240, 260, and 280. Since no other event or triggering symbols, and no winning symbols or winning symbol combinations occurred in this play of the secondary game, the play of the secondary game does not result in: (a) any additional locks placed on any of the digits of any of the progressive awards 220, 240, 260, and 280; (b) any changes to any of the digits of any of the progressive awards 220, 240, 260, and 280; (c) any parts of any of the progressive awards 210, 230, 250, and 270 provided to the player; or (d) any other awards provided to the player.

FIG. 3C shows the results of a third example play of the secondary game. For this example play, since the progressive award triggering event has occurred in the form of the MAJOR-MAJOR-MAJOR winning symbol combination, and since one lock is still covering one of the digits of the MAJOR progressive award 230, the gaming system has provided only part the player MAJOR progressive award 230 to the player and particularly $850.82 to the player. Since no other event or triggering symbols, and no other winning symbols or winning symbol combinations occurred in this play of the secondary game, this play of the secondary game does not result in: (a) any additional locks placed on any of the digits of any of the progressive awards 220, 240, 260, and 280; (b) any changes of any of the digits of any of the progressive awards 220, 240, 260, and 280 except for a reset (not shown) of the MAJOR award provided to the player. It should be appreciated that the gaming system would then continue in this manner for any remaining quantity of free plays of the secondary game.

As indicated in these examples, because only parts of the progressive awards are paid out to player when won, the progressive award triggering events can occur more often—while still keeping the larger overall progressive award available to be won by players.

Various embodiments of the present disclosure additionally contemplate additional or alternative features such as but not limited to: (1) one or more of the above described events occurring without being associated with a specific play of a game; (2) one or more modifiers (such as multipliers) can be provided for any of the awards in any suitable manner; (3) quicker game plays when some or all of the digits of the progressive awards are uncovered, especially if they are uncovered for limited periods of time; and (4) retriggers of free plays of the secondary game can be provided in any suitable manners and enhances the digit covering and uncovering features.

It should be appreciated from the above and from the further gaming system related explanations provided below that various embodiments of the present disclosure provide a gaming system including among other elements, a processor and a memory device that stores a plurality of instructions, that when executed by the processor, cause the processor to: (a) communicate data that results in a display, by a display device, of a first award comprising multiple digits; (b) communicate data that results in a display, by the display device, of a first lock covering a first one of the digits of the first award; (c) responsive to an occurrence of a first lock movement event, communicate data that results in a display, by the display device, of the first lock uncovering the first one of the digits of the first award and the first lock covering a second one of the digits of the first award; (d) responsive to an occurrence of a first lock removal event, communicate data that results in a display, by the display device, of the first lock uncovering one of the digits of the first award without covering any of the other digits of the first award; and (e) responsive to an occurrence of a first award triggering event associated with a play of a game, communicate data that results in a display, by the display device, of a player award based on the digits of the first award that are not covered by the first lock at a time of the occurrence of the first award triggering event. In various such embodiments: (i) response to the occurrence of the first lock movement event, the processor communicates data that results in a display, by the display device, of the first lock moving from the first one of the digits of the first award to the second one of the digits of the first award; (ii) the first lock movement event is associated with a direction of movement of the first lock; (iii) the processor communicates data that results in a display, by the display device, a second lock covering a second one of the digits of the first award, and responsive to the occurrence of the first lock removal event, communicate data that results in a display, by the display device, of the second lock uncovering the second one of the digits of the first award without covering any of the other digits of the first award; (iv) responsive to an occurrence of a digit change event, the processor communicates data that results in a display, by the display device, of a change to one of the digits of the first award not covered by the first lock; (v) responsive to an occurrence of a digit change event, the processor communicates data that results in a display, by the display device, of changes to all of the digits of the first award that are not covered by any lock; (vi) the processor prevents the first lock from ever covering one of the digits of the award; (vii) the occurrence of the first lock movement event, the occurrence of the first lock removal event, and the occurrence of the award triggering event are based on random determinations for at least one play of the game; or (viii) the first award is a progressive award wherein the digits of the award are changeable.

It should be appreciated from the above and from the further gaming system related explanations provided below that other various embodiments of the present disclosure provide a gaming system including among other elements, a processor and a memory device that stores a plurality of instructions, that when executed by the processor, cause the processor to: (a) communicate data that results in a display, by a display device, of a first award and a second award, each of the first award and the second award comprising multiple digits; (b) communicate data that results in a display, by the display device, of a first lock covering a first one of the digits of the first award and a second lock covering a first one of the digits of the second award; (c) responsive to an occurrence of a lock movement event, communicate data that results in a display, by the display device, of at least one of (i) the first lock uncovering the first one of the digits of the first award and the first lock covering a second one of the digits of the first award, and (ii) the second lock uncovering the first one of the digits of the second award and the second lock covering a second one of the digits of the second award; (d) responsive to an occurrence of a lock removal event, communicate data that results in a display, by the display device, of at least one of (i) the first lock uncovering one of the digits of the first award without covering any of the other digits of the first award, and (ii) the second lock uncovering one of the digits of the second award without covering any of the other digits of the second award; and (e) responsive to an occurrence of an award triggering event associated with a play of a game, communicate data that results in a display, by the display device, of a player award based on at least one of (i) the digits of the first award that are not covered by the first lock at a time of the occurrence of the award triggering event, and (i) the digits of the second award that are not covered by the second lock at a time of the occurrence of the award triggering event. In various such embodiments: (A) responsive to the occurrence of the lock movement event, the processor communicates data that results in a display, by the display device, of (i) the first lock uncovering the first one of the digits of the first award and the first lock covering the second one of the digits of the first award, and (ii) the second lock uncovering the first one of the digits of the second award and the second lock covering the second one of the digits of the second award; (B) responsive to the occurrence of the lock removal event, the processor communicates data that results in a display, by the display device, of (i) the first lock uncovering one of the digits of the first award without covering any of the other digits of the first award, and (ii) the second lock uncovering one of the digits of the second award without covering any of the other digits of the second award; (C) responsive to an occurrence of a digit change triggering event, the processor communicates data that results in a display, by the display device, of at least (i) one of the digits of the first award not covered by the first lock changing, and (ii) one of the digits of the second award not covered by the second lock changing; or (D) the occurrence of the lock movement triggering event, the occurrence of the lock removal triggering event, and the occurrence of the award triggering event are based on random determinations for one of a play of a primary game and a play of a secondary game.

It should be appreciated from the above and from the further gaming system related explanations provided below that other various embodiments of the present disclosure provide a method of operating a gaming system, the method including: (a) communicating data that results in a display, by a display device, of an award comprising multiple digits; (b) communicating data that results in a display, by the display device, of a lock covering a first one of the digits of the award; (c) responsive to an occurrence of a lock movement event, communicating data that results in a display, by the display device, of the lock uncovering the first one of the digits of the award and the lock covering a second one of the digits of the award; (d) responsive to an occurrence of a lock removal event, communicating data that results in a display, by the display device, of the lock uncovering one of the digits of the award without covering any of the other digits of the award; and (e) responsive to an occurrence of an award triggering event associated with a play of the game, communicating data that results in a display, by the display device, of a player award based on the digits of the award that are not covered by the lock at a time of the occurrence of the award triggering event. In various such embodiments, the method further includes: (i) responsive to an occurrence of a digit change event, communicating data that results in a display, by the display device, of a change to one of the digits of the award not covered by the lock; (ii) preventing the lock from ever covering a plurality of the digits of the award; (iii) separately randomly determining the occurrence of the lock movement event, the occurrence of the lock removal event, and the occurrence of the award triggering event for at least one play of the game; (iv) wherein award is a progressive award, and which comprises changing the digits of the award before or after a play of the game; or (v) communicating data that results in a display, by the display device, of a plurality of different locks covering a plurality of the digits of the award.

In various embodiments of the present disclosure, one or more of the above described events occurs based on an outcome associated with one or more plays of a primary game or a secondary game. In various embodiments, such determinations are symbol driven based on the generation of one or more designated symbols or symbol combinations. In various embodiments, a generation of a designated symbol (or sub-symbol) or a designated set of symbols (or sub-symbols) over one or more plays of a game causes such conditions to be satisfied and/or one or more of such events to occur. In various other embodiments, the gaming system does not provide any apparent reasons to the players for an occurrence of an event. In these embodiments, such determinations are not triggered by an event in a game or based specifically on any of the plays of any game. That is, these events occur without any explanation or alternatively with simple explanations. It should thus be appreciated that any suitable manner of causing an event to occur may be implemented in accordance with the gaming system and method disclosed herein. It should be further appreciated that one or more of the above-described triggers occurring may be combined in one or more different embodiments.

It should further be appreciated that in various embodiments of the present disclosure, when one or more of the events occur and/or any determination of the present disclosure is/are predetermined, randomly determined, randomly determined based on one or more weighted percentages, determined based on a generated game outcome, determined independent of a generated game outcome, determined based on a random determination by the central controller, determined independent of a random determination by the central controller, determined based on a random determination at the gaming system, determined independent of a random determination at the gaming system, determined based on at least one play of at least one game, determined independent of at least one play of at least one game, determined based on a player's selection, determined independent of a player's selection, determined based on one or more side wagers placed, determined independent of one or more side wagers placed, determined based on the player's primary game wager, determined independent of the player's primary game wager, determined based on time (such as the time of day), determined independent of time (such as the time of day), determined based on an amount of coin-in accumulated in one or more pools, determined independent of an amount of coin-in accumulated in one or more pools, determined based on a status of the player (i.e., a player tracking status), determined independent of a status of the player (i.e., a player tracking status), determined based on one or more other determinations of the present disclosure, determined independent of any other determination of the present disclosure or determined based on any other suitable method or criteria.

It should be appreciated from the above that the present disclosure provides an improvement in gaming technology, in part, by enabling increased play of gaming systems such as electronic gaming machines due to configurations and different modifications of the progressive awards as indicated above. Such features increase usage of such gaming systems, and may reduce wear on other gaming systems not incorporating such features. It should be appreciated that the present disclosure provides an improvement in gaming technology, in part, by providing new ways to rapidly change awards and thus increase the chances that a player will continue to play games on the gaming system thus increasing usage of such gaming system. It should be appreciated that the present disclosure provides an improvement in gaming technology, in part, by providing substantial volatility of the plays of games via introducing multiple different random determinations (instead of a single random determination) that can be but do not have to be dependent on each other. This configuration thus provides a heightened level of player anticipation and enhances player interaction with the gaming system.

Gaming Systems

The above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. A "gaming system" as used herein refers to various configurations of: (a) one or more central servers, central controllers, or remote hosts; (b) one or more electronic gaming machines such as those located on a casino floor; and/or (c) one or more personal gaming devices, such as desktop computers, laptop computers, tablet computers or computing devices, personal digital assistants, mobile phones, and other mobile computing devices. Moreover, an EGM as used herein refers to any suitable electronic gaming machine which enables a player to play a game (including but not limited to a game of chance, a game of skill, and/or a game of partial skill) to potentially win one or more awards and/or place zero, one or more wagers on one or more sporting events, wherein the EGM include, but is not limited to: a slot machine, a video poker machine, a video lottery terminal, a terminal associated with an electronic table game, a video keno machine, a video bingo machine located on a casino floor, or a sports betting terminal.

In various embodiments, the gaming system of the present disclosure includes: (a) one or more electronic gaming machines in combination with one or more central servers, central controllers, or remote hosts; (b) one or more personal gaming devices in combination with one or more central servers, central controllers, or remote hosts; (c) one or more personal gaming devices in combination with one or more electronic gaming machines; (d) one or more personal gaming devices, one or more electronic gaming machines, and one or more central servers, central controllers, or remote hosts in combination with one another; (e) a single electronic gaming machine; (f) a plurality of electronic gaming machines in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity and unless specifically stated otherwise, "EGM" as used herein represents one EGM or a plurality of EGMs, "personal gaming device" as used herein represents one personal gaming device or a plurality of personal gaming devices, and "central server, central controller, or remote host" as used herein represents one central server, central controller, or remote host or a plurality of central servers, central controllers, or remote hosts.

As noted above, in various embodiments, the gaming system includes an EGM (or personal gaming device) in combination with a central server, central controller, or remote host. In such embodiments, the EGM (or personal gaming device) is configured to communicate with the central server, central controller, or remote host through a data network or remote communication link. In certain such embodiments, the EGM (or personal gaming device) is configured to communicate with another EGM (or personal gaming device) through the same data network or remote communication link or through a different data network or remote communication link. For example, the gaming system includes a plurality of EGMs that are each configured to communicate with a central server, central controller, or remote host through a data network.

In certain embodiments in which the gaming system includes an EGM (or personal gaming device) in combination with a central server, central controller, or remote host, the central server, central controller, or remote host is any suitable computing device (such as a server) that includes at least one processor and at least one memory device or data storage device. As further described herein, the EGM (or personal gaming device) includes at least one EGM (or personal gaming device) processor configured to transmit and receive data or signals representing events, messages, commands, or any other suitable information between the EGM (or personal gaming device) and the central server, central controller, or remote host. The at least one processor of that EGM (or personal gaming device) is configured to execute the events, messages, or commands represented by such data or signals in conjunction with the operation of the EGM (or personal gaming device). Moreover, the at least one processor of the central server, central controller, or remote host is configured to transmit and receive data or signals representing events, messages, commands, or any other suitable information between the central server, central controller, or remote host and the EGM (or personal gaming device). The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM (or personal gaming device). Further, one, more than one, or each of the functions of the at least one processor of the EGM (or personal gaming device) may be performed by the at least one processor of the central server, central controller, or remote host.

In certain such embodiments, computerized instructions for controlling any games (such as any primary or base games and/or any secondary or bonus games) displayed by the EGM (or personal gaming device) are executed by the central server, central controller, or remote host. In such "thin client" embodiments, the central server, central controller, or remote host remotely controls any games (or other suitable interfaces) displayed by the EGM (or personal gaming device), and the EGM (or personal gaming device) is utilized to display such games (or suitable interfaces) and to receive one or more inputs or commands. In other such embodiments, computerized instructions for controlling any games displayed by the EGM (or personal gaming device) are communicated from the central server, central controller, or remote host to the EGM (or personal gaming device) and are stored in at least one memory device of the EGM (or personal gaming device). In such "thick client" embodiments, the at least one processor of the EGM (or personal gaming device) executes the computerized instructions to control any games (or other suitable interfaces) displayed by the EGM (or personal gaming device).

In various embodiments in which the gaming system includes a plurality of EGMs (or personal gaming devices), one or more of the EGMs (or personal gaming devices) are thin client EGMs (or personal gaming devices) and one or more of the EGMs (or personal gaming devices) are thick client EGMs (or personal gaming devices). In other embodiments in which the gaming system includes one or more EGMs (or personal gaming devices), certain functions of one or more of the EGMs (or personal gaming devices) are implemented in a thin client environment, and certain other functions of one or more of the EGMs (or personal gaming devices) are implemented in a thick client environment. In one such embodiment in which the gaming system includes an EGM (or personal gaming device) and a central server, central controller, or remote host, computerized instructions for controlling any primary or base games displayed by the EGM (or personal gaming device) are communicated from the central server, central controller, or remote host to the EGM (or personal gaming device) in a thick client configuration, and computerized instructions for controlling any secondary or bonus games or other functions displayed by the EGM (or personal gaming device) are executed by the central server, central controller, or remote host in a thin client configuration.

In certain embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a data network, the data network is a local area network (LAN) in which the EGMs (or personal gaming devices) are located substantially proximate to one another and/or the central server, central controller, or remote host. In one example, the EGMs (or personal gaming devices) and the central server, central controller, or remote host are located in a gaming establishment or a portion of a gaming establishment.

In other embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a data network, the data network is a wide area network (WAN) in which one or more of the EGMs (or personal gaming devices) are not necessarily located substantially proximate to another one of the EGMs (or personal gaming devices) and/or the central server, central controller, or remote host. For example, one or more of the EGMs (or personal gaming devices) are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs (or personal gaming devices) are located. In certain embodiments in which the data network is a WAN, the gaming system includes a central server, central controller, or remote host and an EGM (or personal gaming device) each located in a different gaming establishment in a same geographic area, such as a same city or a same state. Gaming systems in which the data network is a WAN are substantially identical to gaming systems in which the data network is a LAN, though the quantity of EGMs (or personal gaming devices) in such gaming systems may vary relative to one another.

In further embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a data network, the data network is an internet (such as the Internet) or an intranet. In certain such embodiments, an Internet browser of the EGM (or personal gaming device) is usable to access an Internet game page from any location where an Internet connection is available. In one such embodiment, after the EGM (or personal gaming device) accesses the Internet game page, the central server, central controller, or remote host identifies a player before enabling that player to place any wagers on any plays of any wagering games. In one example, the central server, central controller, or remote host identifies the player by requiring a player account of the player to be logged into via an input of a unique player name and password combination assigned to the player. The central server, central controller, or remote host may, however, identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM (or personal gaming device), such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the Internet browser of the EGM (or personal gaming device). Examples of implementations of Internet-based gaming are further described in U.S. Pat. No. 8,764,566, entitled “Internet Remote Game Server,” and U.S. Pat. No. 8,147,334, entitled “Universal Game Server”.

The central server, central controller, or remote host and the EGM (or personal gaming device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 4:
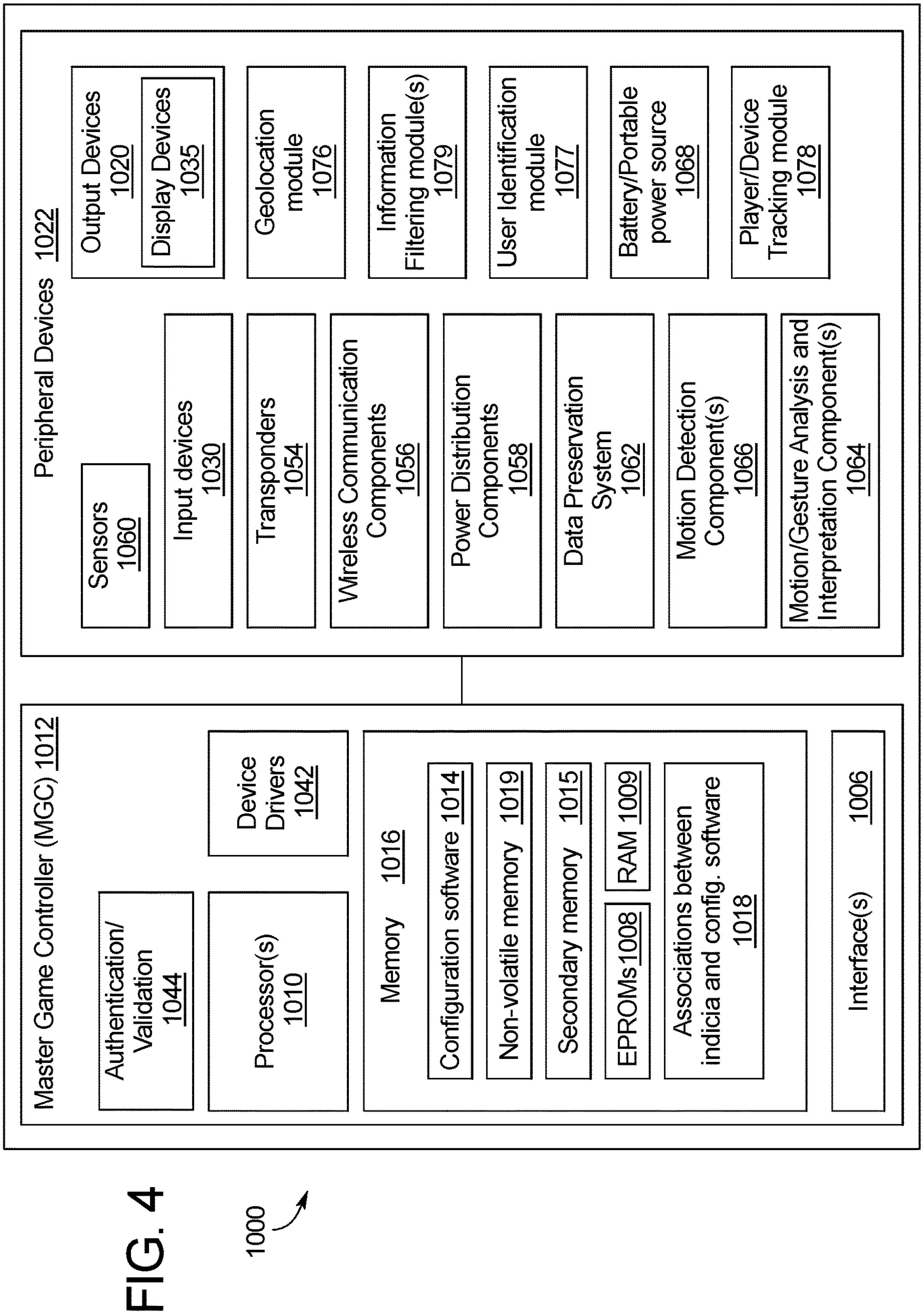
FIG. 4 is a schematic block diagram of one embodiment of an electronic configuration of an example gaming system of the present disclosure.
Figure 5A:
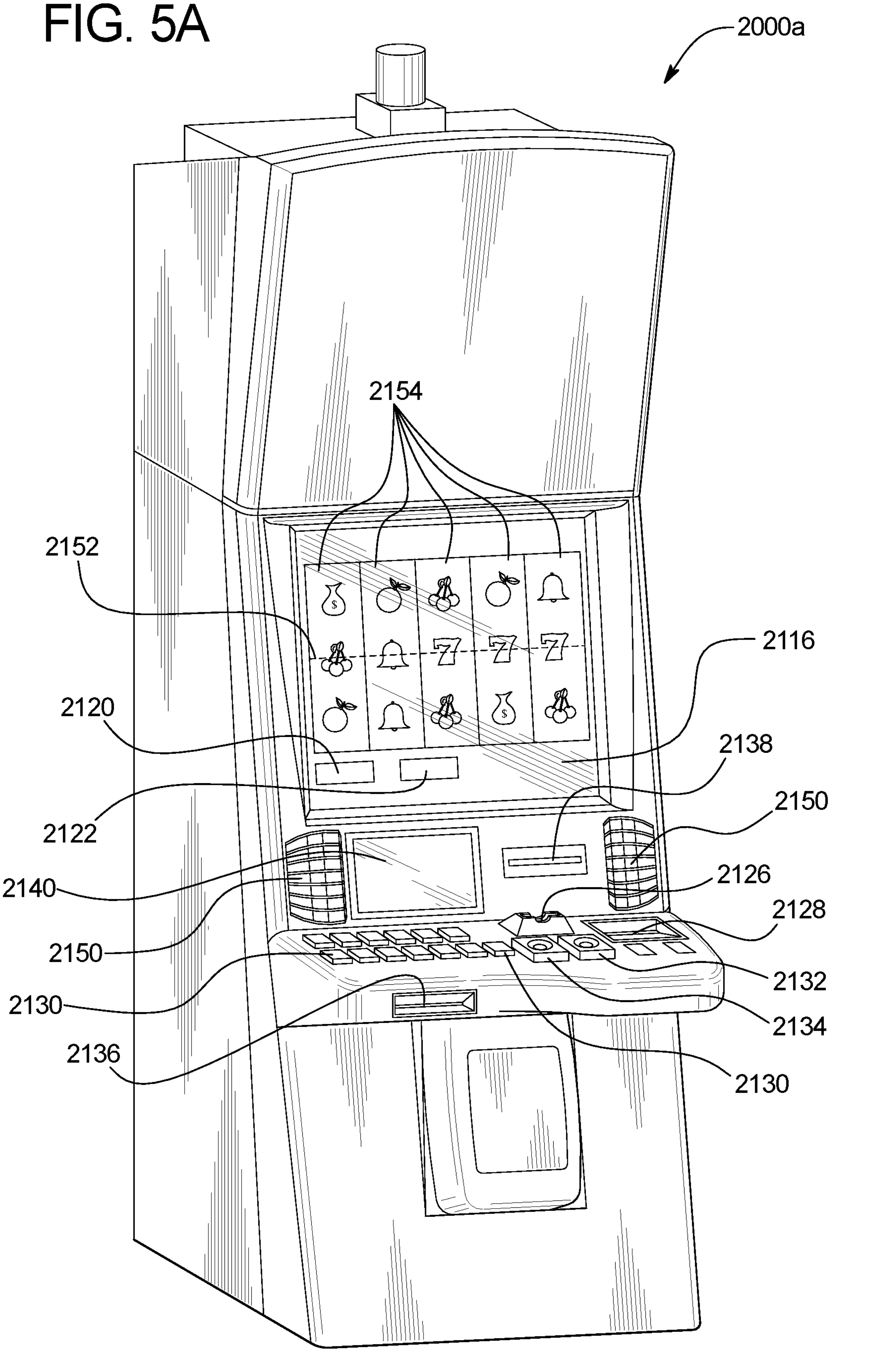
FIGS. 5A and 5B are perspective views of example alternative embodiments of the gaming system of the present disclosure.
Figure 5B:
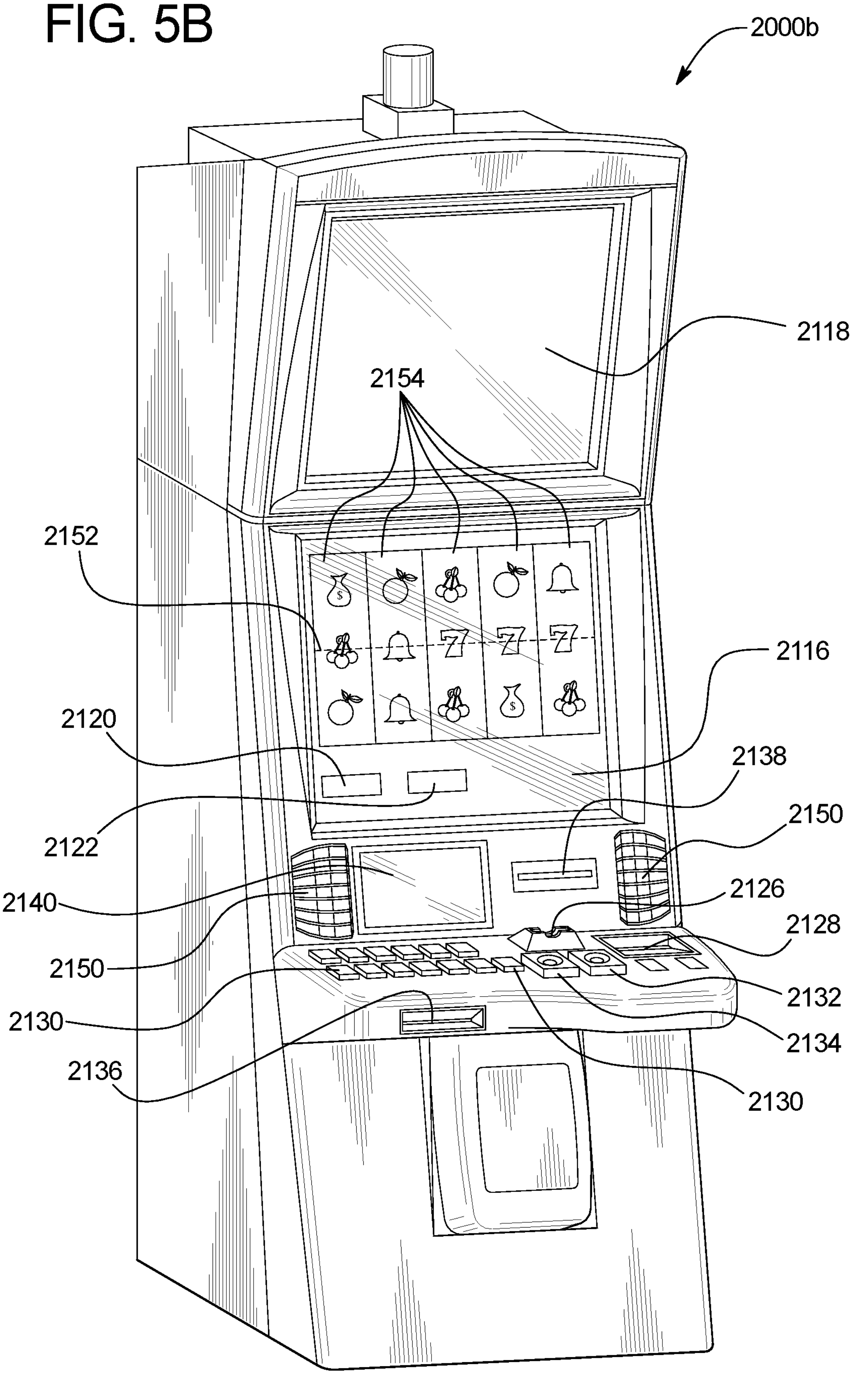
Figure 5C:
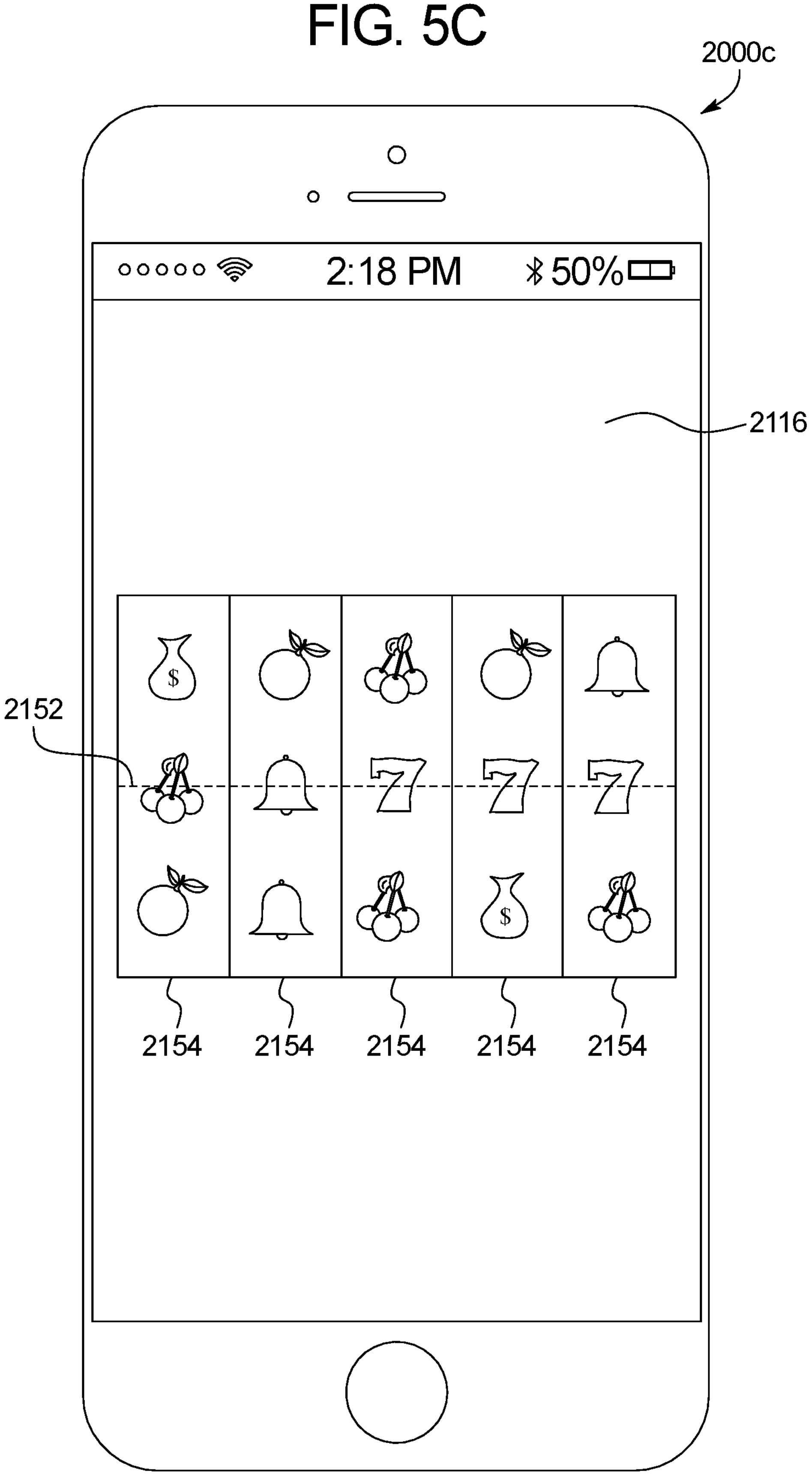
FIG. 5C is a front view of an example personal gaming device of the gaming system of the present disclosure.

FIG. 4 is a block diagram of an example EGM 1000 and FIGS. 5A and 5B include two different example EGMs 2000*a* and 2000*b*. The EGMs 1000, 2000*a*, and 2000*b* are merely example EGMs, and different EGMs may be implemented using different combinations of the components shown in the EGMs 1000, 2000*a*, and 2000*b*. Although the below refers to EGMs, in various embodiments personal gaming devices (such as personal gaming device 2000*c* of FIG. 5C) may include some or all of the below components.

In these embodiments, the EGM 1000 includes a master gaming controller 1012 configured to communicate with and to operate with a plurality of peripheral devices 1022.

The master gaming controller 1012 includes at least one processor 1010. The at least one processor 1010 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface 1006 of the master gaming controller 1012; (2) converting signals read by an interface to a format corresponding to that used by software or memory of the EGM; (3) accessing memory to configure or reconfigure game parameters in the memory according to indicia read from the EGM; (4) communicating with interfaces and the peripheral devices 1022 (such as input/output devices); and/or (5) controlling the peripheral devices 1022. In certain embodiments, one or more components of the master gaming controller 1012 (such as the at least one processor 1010) reside within a housing of the EGM (described below), while in other embodiments at least one component of the master gaming controller 1012 resides outside of the housing of the EGM.

The master gaming controller 1012 also includes at least one memory device 1016, which includes: (1) volatile memory (e.g., RAM 1009, which can include non-volatile RAM, magnetic RAM, ferroelectric RAM, and any other suitable forms); (2) non-volatile memory 1019 (e.g., disk memory, FLASH memory, EPROMs, EEPROMs, memristor-based non-volatile solid-state memory, etc.); (3) unalterable memory (e.g., EPROMs 1008); (4) read-only memory; and/or (5) a secondary memory storage device 1015, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the EGM of the present disclosure. In certain embodiments, the at least one memory device 1016 resides within the housing of the EGM (described below), while in other embodiments at least one component of the at least one memory device 1016 resides outside of the housing of the EGM. In these embodiments, any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

The at least one memory device 1016 is configured to store, for example: (1) configuration software 1014, such as all the parameters and settings for a game playable on the EGM; (2) associations 1018 between configuration indicia read from an EGM with one or more parameters and settings; (3) communication protocols configured to enable the at least one processor 1010 to communicate with the peripheral devices 1022; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the EGM to communicate with local and non-local devices using such protocols. In one implementation, the master gaming controller 1012 communicates with other devices using a serial communication protocol. A few non-limiting examples of serial communication protocols that other devices, such as peripherals (e.g., a bill validator or a ticket printer), may use to communicate with the master game controller 1012 include USB, RS-232, and Netplex (a proprietary protocol developed by IGT).

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the player's computer, partly on the player's computer, as a stand-alone software package, partly on the player's computer and partly on a remote computer or entirely on the remote computer or server. In the latter scenario, the remote computer may be connected to the player's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In certain embodiments, the at least one memory device 1016 is configured to store program code and instructions executable by the at least one processor of the EGM to control the EGM. The at least one memory device 1016 of the EGM also stores other operating data, such as image data, event data, input data, random number generators (RNGs) or pseudo-RNGs, paytable data or information, and/or applicable game rules that relate to the play of one or more games on the EGM. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an Internet or intranet).

The at least one memory device 1016 also stores a plurality of device drivers 1042. Examples of different types of device drivers include device drivers for EGM components and device drivers for the peripheral components 1022. Typically, the device drivers 1042 utilize various communication protocols that enable communication with a particular physical device. The device driver abstracts the hardware implementation of that device. For example, a device driver may be written for each type of card reader that could potentially be connected to the EGM. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the EGM loads the new device driver from the at least one memory device to enable communication with the new device. For instance, one type of card reader in the EGM can be replaced with a second different type of card reader when device drivers for both card readers are stored in the at least one memory device.

In certain embodiments, the software units stored in the at least one memory device 1016 can be upgraded as needed. For instance, when the at least one memory device 1016 is a hard drive, new games, new game options, new parameters, new settings for existing parameters, new settings for new parameters, new device drivers, and new communication protocols can be uploaded to the at least one memory device 1016 from the master game controller 1012 or from some other external device. As another example, when the at least one memory device 1016 includes a CD/DVD drive including a CD/DVD configured to store game options, parameters, and settings, the software stored in the at least one memory device 1016 can be upgraded by replacing a first CD/DVD with a second CD/DVD. In yet another example, when the at least one memory device 1016 uses flash memory 1019 or EPROM 1008 units configured to store games, game options, parameters, and settings, the software stored in the flash and/or EPROM memory units can be upgraded by replacing one or more memory units with new memory units that include the upgraded software. In another embodiment, one or more of the memory devices, such as the hard drive, may be employed in a game software download process from a remote software server.

In some embodiments, the at least one memory device 1016 also stores authentication and/or validation components 1044 configured to authenticate/validate specified EGM components and/or information, such as hardware components, software components, firmware components, peripheral device components, player input device components, information received from one or more player input devices, information stored in the at least one memory device 1016, etc. Examples of various authentication and/or validation components are described in U.S. Pat. No. 6,620,047, entitled "Electronic Gaming Apparatus Having Authentication Data Sets".

In certain embodiments, the peripheral devices 1022 include several device interfaces, such as: (1) at least one output device 1020 including at least one display device 1035; (2) at least one input device 1030 (which may include contact and/or non-contact interfaces); (3) at least one transponder 1054; (4) at least one wireless communication component 1056; (5) at least one wired/wireless power distribution component 1058; (6) at least one sensor 1060; (7) at least one data preservation component 1062; (8) at least one motion/gesture analysis and interpretation component 1064; (9) at least one motion detection component 1066; (10) at least one portable power source 1068; (11) at least one geolocation module 1076; (12) at least one player identification module 1077; (13) at least one player/device tracking module 1078; and (14) at least one information filtering module 1079.

The at least one output device 1020 includes at least one display device 1035 configured to display any game(s) displayed by the EGM and any suitable information associated with such game(s). In certain embodiments, the display devices are connected to or mounted on a housing of the EGM (described below). In various embodiments, the display devices serve as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM 2000*a* illustrated in FIG. 5A includes a central display device 2116, a player tracking display 2140, a credit display 2120, and a bet display 2122. The example EGM 2000*b* illustrated in FIG. 5B includes a central display device 2116, an upper display device 2118, a player tracking display 2140, a credit display 2120, and a bet display 2122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device 1020 includes a payout device. In these embodiments, after the EGM receives an actuation of a cashout device (described below), the EGM causes the payout device to provide a payment to the player. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. The example EGMs 2000*a* and 2000*b* illustrated in FIGS. 5A and 5B each include a ticket printer and dispenser 2136. Examples of ticket-in ticket-out (TITO) technology are described in U.S. Pat. No. 5,429,361, entitled "Gaming Machine Information, Communication and Display System"; U.S. Pat. No. 5,470,079, entitled "Gaming Machine Accounting and Monitoring System"; U.S. Pat. No. 5,265,874, entitled "Cashless Gaming Apparatus and Method"; U.S. Pat. No. 6,729,957, entitled "Gaming Method and Host Computer with Ticket-In/Ticket-Out Capability"; U.S. Pat. No. 6,729,958, entitled "Gaming System with Ticket-In/Ticket-Out Capability"; U.S. Pat. No. 6,736,725, entitled "Gaming Method and Host Computer with Ticket-In/Ticket-Out Capability"; U.S. Pat. No. 7,275,991, entitled "Slot Machine with Ticket-In/Ticket-Out Capability"; and U.S. Pat. No. 6,048,269, entitled "Coinless Slot Machine System and Method".

In certain embodiments, rather than dispensing bills, coins, or a physical ticket having a monetary value to the player following receipt of an actuation of the cashout device, the payout device is configured to cause a payment to be provided to the player in the form of an electronic funds transfer, such as via a direct deposit into a bank account, a casino account, or a prepaid account of the player; via a transfer of funds onto an electronically recordable identification card or smart card of the player; or via sending a virtual ticket having a monetary value to an electronic device of the player. Examples of providing payment using virtual tickets are described in U.S. Pat. No. 8,613,659, entitled "Virtual Ticket-In and Ticket-Out on a Gaming Machine".

While any credit balances, any wagers, any values, and any awards are described herein as amounts of monetary credits or currency, one or more of such credit balances, such wagers, such values, and such awards may be for non-monetary credits, promotional credits, of player tracking points or credits.

In certain embodiments, the at least one output device 1020 is a sound generating device controlled by one or more sound cards. In one such embodiment, the sound generating device includes one or more speakers or other sound generating hardware and/or software configured to generate sounds, such as by playing music for any games or by playing music for other modes of the EGM, such as an attract mode. The example EGMs 2000*a* and 2000*b* illustrated in FIGS. 5A and 5B each include a plurality of speakers 2150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

The at least one input device 1030 may include any suitable device that enables an input signal to be produced and received by the at least one processor 1010 of the EGM.

In one embodiment, the at least one input device 1030 includes a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. The example EGMs 2000*a* and 2000*b* illustrated in FIGS. 5A and 5B each include a combined bill and ticket acceptor 2128 and a coin slot 2126.

In one embodiment, the at least one input device 1030 includes a payment device configured to enable the EGM to be funded via an electronic funds transfer, such as a transfer of funds from a bank account. In another embodiment, the EGM includes a payment device configured to communicate with a mobile device of a player, such as a mobile phone, a radio frequency identification tag, or any other suitable wired or wireless device, to retrieve relevant information associated with that player to fund the EGM. Examples of funding an EGM via communication between the EGM and a mobile device (such as a mobile phone) of a player are described in U.S. Patent Application Publication No. 2013/0344942, entitled "Avatar as Security Measure for Mobile Device Use with Electronic Gaming Machine". When the EGM is funded, the at least one processor determines the amount of funds entered and displays the corresponding amount on a credit display or any other suitable display as described below.

In certain embodiments, the at least one input device 1030 includes at least one wagering or betting device. In various embodiments, the one or more wagering or betting devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). One such wagering or betting device is as a maximum wager or bet device that, when actuated, causes the EGM to place a maximum wager on a play of a game. Another such wagering or betting device is a repeat bet device that, when actuated, causes the EGM to place a wager that is equal to the previously-placed wager on a play of a game. A further such wagering or betting device is a bet one device that, when actuated, causes the EGM to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device 1030 includes at least one game play activation device. In various embodiments, the one or more game play initiation devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). After a player appropriately funds the EGM and places a wager, the EGM activates the game play activation device to enable the player to actuate the game play activation device to initiate a play of a game on the EGM (or another suitable sequence of events associated with the EGM). After the EGM receives an actuation of the game play activation device, the EGM initiates the play of the game. The example EGMs 2000*a* and 2000*b* illustrated in FIGS. 5A and 5B each include a game play activation device in the form of a game play initiation button 2132. In other embodiments, the EGM begins game play automatically upon appropriate funding rather than upon utilization of the game play activation device.

In other embodiments, the at least one input device 1030 includes a cashout device. In various embodiments, the cashout device is: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). When the EGM receives an actuation of the cashout device from a player and the player has a positive (i.e., greater-than-zero) credit balance, the EGM initiates a payout associated with the player's credit balance. The example EGMs 2000*a* and 2000*b* illustrated in FIGS. 5A and 5B each include a cashout device in the form of a cashout button 2134.

In various embodiments, the at least one input device 1030 includes a plurality of buttons that are programmable by the EGM operator to, when actuated, cause the EGM to perform particular functions. For instance, such buttons may be hard keys, programmable soft keys, or icons icon displayed on a display device of the EGM (described below) that are actuatable via a touch screen of the EGM (described below) or via use of a suitable input device of the EGM (such as a mouse or a joystick). The example EGMs 2000*a* and 2000*b* illustrated in FIGS. 5A and 5B each include a plurality of such buttons 2130.

In certain embodiments, the at least one input device 1030 includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In embodiments including a player tracking system, as further described below, the at least one input device 1030 includes a card reader in communication with the at least one processor of the EGM. The example EGMs 2000*a* and 2000*b* illustrated in FIGS. 5A and 5B each include a card reader 2138. The card reader is configured to read a player identification card inserted into the card reader.

The at least one wireless communication component 1056 includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 1056 transmits electrical, electromagnetic, or optical signals that carry digital data streams or analog signals representing various types of information.

The at least one wired/wireless power distribution component 1058 includes components or devices that are configured to provide power to other devices. For example, in one embodiment, the at least one power distribution component 1058 includes a magnetic induction system that is configured to provide wireless power to one or more player input devices near the EGM. In one embodiment, a player input device docking region is provided, and includes a power distribution component that is configured to recharge a player input device without requiring metal-to-metal contact. In one embodiment, the at least one power distribution component 1058 is configured to distribute power to one or more internal components of the EGM, such as one or more rechargeable power sources (e.g., rechargeable batteries) located at the EGM.

In certain embodiments, the at least one sensor 1060 includes at least one of: optical sensors, pressure sensors, RF sensors, infrared sensors, image sensors, thermal sensors, and biometric sensors. The at least one sensor 1060 may be used for a variety of functions, such as: detecting movements and/or gestures of various objects within a predetermined proximity to the EGM; detecting the presence and/or identity of various persons (e.g., players, casino employees, etc.), devices (e.g., player input devices), and/or systems within a predetermined proximity to the EGM.

The at least one data preservation component 1062 is configured to detect or sense one or more events and/or conditions that, for example, may result in damage to the EGM and/or that may result in loss of information associated with the EGM. Additionally, the data preservation system 1062 may be operable to initiate one or more appropriate action(s) in response to the detection of such events/conditions.

The at least one motion/gesture analysis and interpretation component 1064 is configured to analyze and/or interpret information relating to detected player movements and/or gestures to determine appropriate player input information relating to the detected player movements and/or gestures. For example, in one embodiment, the at least one motion/gesture analysis and interpretation component 1064 is configured to perform one or more of the following functions: analyze the detected gross motion or gestures of a player; interpret the player's motion or gestures (e.g., in the context of a casino game being played) to identify instructions or input from the player; utilize the interpreted instructions/input to advance the game state; etc. In other embodiments, at least a portion of these additional functions may be implemented at a remote system or device.

The at least one portable power source 1068 enables the EGM to operate in a mobile environment. For example, in one embodiment, the EGM 300 includes one or more rechargeable batteries.

The at least one geolocation module 1076 is configured to acquire geolocation information from one or more remote sources and use the acquired geolocation information to determine information relating to a relative and/or absolute position of the EGM. For example, in one implementation, the at least one geolocation module 1076 is configured to receive GPS signal information for use in determining the position or location of the EGM. In another implementation, the at least one geolocation module 1076 is configured to receive multiple wireless signals from multiple remote devices (e.g., EGMs, servers, wireless access points, etc.) and use the signal information to compute position/location information relating to the position or location of the EGM.

The at least one player identification module 1077 is configured to determine the identity of the current player or current owner of the EGM. For example, in one embodiment, the current player is required to perform a login process at the EGM in order to access one or more features. Alternatively, the EGM is configured to automatically determine the identity of the current player based on one or more external signals, such as an RFID tag or badge worn by the current player and that provides a wireless signal to the EGM that is used to determine the identity of the current player. In at least one embodiment, various security features are incorporated into the EGM to prevent unauthorized players from accessing confidential or sensitive information.

The at least one information filtering module 1079 is configured to perform filtering (e.g., based on specified criteria) of selected information to be displayed at one or more displays 1035 of the EGM.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. U.S. Pat. No. 7,290,072 describes a variety of EGMs including one or more communication ports that enable the EGMs to communicate and operate with one or more external peripherals.

As generally described above, in certain embodiments, such as the example EGMs 2000*a* and 2000*b* illustrated in FIGS. 5A and 5B, the EGM has a support structure, housing, or cabinet that provides support for a plurality of the input devices and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs 2000*a* and 2000*b* shown in FIGS. 5A and 5B, EGMs may have varying housing and display configurations.

In certain embodiments, the EGM is a device that has obtained approval from a regulatory gaming commission, and in other embodiments, the EGM is a device that has not obtained approval from a regulatory gaming commission.

The EGMs described above are merely three examples of different types of EGMs. Certain of these example EGMs may include one or more elements that may not be included in all gaming systems, and these example EGMs may not include one or more elements that are included in other gaming systems. For example, certain EGMs include a coin acceptor while others do not.

Operation of Primary or Base Games and/or Secondary or Bonus Games

In various embodiments, an EGM may be implemented in one of a variety of different configurations. In various embodiments, the EGM may be implemented as one of: (a) a dedicated EGM in which computerized game programs executable by the EGM for controlling any primary or base games (referred to herein as "primary games") and/or any secondary or bonus games or other functions (referred to herein as "secondary games") displayed by the EGM are provided with the EGM before delivery to a gaming establishment or before being provided to a player; and (b) a changeable EGM in which computerized game programs executable by the EGM for controlling any primary games and/or secondary games displayed by the EGM are downloadable or otherwise transferred to the EGM through a data network or remote communication link; from a USB drive, flash memory card, or other suitable memory device; or in any other suitable manner after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. Examples of this type of award evaluation are described in U.S. Pat. No. 7,470,183, entitled "Finite Pool Gaming Method and Apparatus"; U.S. Pat. No. 7,563,163, entitled "Gaming Device Including Outcome Pools for Providing Game Outcomes"; U.S. Pat. No. 7,833,092, entitled "Method and System for Compensating for Player Choice in a Game of Chance"; U.S. Pat. No. 8,070,579, entitled "Bingo System with Downloadable Common Patterns"; and U.S. Pat. No. 8,398,472, entitled "Central Determination Poker Game".

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. Examples of this type of award determination are described in U.S. Pat. No. 7,753,774, entitled "Using Multiple Bingo Cards to Represent Multiple Slot Paylines and Other Class III Game Options"; U.S. Pat. No. 7,731,581, entitled "Multi-Player Bingo Game with Multiple Alternative Outcome Displays"; U.S. Pat. No. 7,955,170, entitled "Providing Non-Bingo Outcomes for a Bingo Game"; U.S. Pat. No. 8,070,579, entitled "Bingo System with Downloadable Common Patterns"; and U.S. Pat. No. 8,500,538, entitled "Bingo Gaming System and Method for Providing Multiple Outcomes from Single Bingo Pattern".

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database configured to store player profiles, (b) a player tracking module configured to track players (as described below), and (c) a credit system configured to provide automated transactions. Examples of such accounting systems are described in U.S. Pat. No. 6,913,534, entitled "Gaming Machine Having a Lottery Game and Capability for Integration with Gaming Device Accounting System and Player Tracking System," and U.S. Pat. No. 8,597,116, entitled "Virtual Player Tracking and Related Services".

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGM **2000*b* shown in FIG. 5 includes a payline 1152 and a plurality of reels 1154**. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. Examples of ways to win award determinations are described in U.S. Pat. No. 8,012,011, entitled "Gaming Device and Method Having Independent Reels and Multiple Ways of Winning"; U.S. Pat. No. 8,241,104, entitled "Gaming Device and Method Having Designated Rules for Determining Ways To Win"; and U.S. Pat. No. 8,430,739, entitled "Gaming System and Method Having Wager Dependent Different Symbol Evaluations".

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. Examples of progressive gaming systems are described in U.S. Pat. No. 7,585,223, entitled "Server Based Gaming System Having Multiple Progressive Awards"; U.S. Pat. No. 7,651,392, entitled "Gaming Device System Having Partial Progressive Payout"; U.S. Pat. No. 7,666,093, entitled "Gaming Method and Device Involving Progressive Wagers"; U.S. Pat. No. 7,780,523, entitled "Server Based Gaming System Having Multiple Progressive Awards"; and U.S. Pat. No. 8,337,298, entitled "Gaming Device Having Multiple Different Types of Progressive Awards".

As generally noted above, in addition to providing winning credits or other awards for one or more plays of the primary game(s), in various embodiments the gaming system provides credits or other awards for one or more plays of one or more secondary games. The secondary game typically enables an award to be obtained addition to any award obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). The secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. Any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for providing the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. Examples of group gaming systems are described in U.S. Pat. No. 8,070,583, entitled "Server Based Gaming System and Method for Selectively Providing One or More Different Tournaments"; U.S. Pat. No. 8,500,548, entitled "Gaming System and Method for Providing Team Progressive Awards"; and U.S. Pat. No. 8,562,423, entitled "Method and Apparatus for Rewarding Multiple Game Players for a Single Win".

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a mobile phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. Examples of player tracking systems are described in U.S. Pat. No. 6,722,985, entitled "Universal Player Tracking System"; U.S. Pat. No. 6,908,387, entitled "Player Tracking Communication Mechanisms in a Gaming Machine"; U.S. Pat. No. 7,311,605, entitled "Player Tracking Assembly for Complete Patron Tracking for Both Gaming and Non-Gaming Casino Activity"; U.S. Pat. No. 7,611,411, entitled "Player Tracking Instruments Having Multiple Communication Modes"; U.S. Pat. No. 7,617,151, entitled "Alternative Player Tracking Techniques"; and U.S. Pat. No. 8,057,298, entitled "Virtual Player Tracking and Related Services".

Web-Based Gaming

In various embodiments, the gaming system includes one or more servers configured to communicate with a personal gaming device—such as a smartphone, a tablet computer, a desktop computer, or a laptop computer—to enable web-based game play using the personal gaming device. In various embodiments, the player must first access a gaming website via an Internet browser of the personal gaming device or execute an application (commonly called an "app") installed on the personal gaming device before the player can use the personal gaming device to participate in web-based game play. In certain embodiments, the one or more servers and the personal gaming device operate in a thin-client environment. In these embodiments, the personal gaming device receives inputs via one or more input devices (such as a touch screen and/or physical buttons), the personal gaming device sends the received inputs to the one or more servers, the one or more servers make various determinations based on the inputs and determine content to be displayed (such as a randomly determined game outcome and corresponding award), the one or more servers send the content to the personal gaming device, and the personal gaming device displays the content.

In certain such embodiments, the one or more servers must identify the player before enabling game play on the personal gaming device (or, in some embodiments, before enabling monetary wager-based game play on the personal gaming device). In these embodiments, the player must identify herself to the one or more servers, such as by inputting the player's unique playername and password combination, providing an input to a biometric sensor (e.g., a fingerprint sensor, a retinal sensor, a voice sensor, or a facial-recognition sensor), or providing any other suitable information.

Once identified, the one or more servers enable the player to establish an account balance from which the player can draw credits usable to wager on plays of a game. In certain embodiments, the one or more servers enable the player to initiate an electronic funds transfer to transfer funds from a bank account to the player's account balance. In other embodiments, the one or more servers enable the player to make a payment using the player's credit card, debit card, or other suitable device to add money to the player's account balance. In other embodiments, the one or more servers enable the player to add money to the player's account balance via a peer-to-peer type application, such as PayPal or Venmo. The one or more servers also enable the player to cash out the player's account balance (or part of it) in any suitable manner, such as via an electronic funds transfer, by initiating creation of a paper check that is mailed to the player, or by initiating printing of a voucher at a kiosk in a gaming establishment.

In certain embodiments, the one or more servers include a payment server that handles establishing and cashing out players' account balances and a separate game server configured to determine the outcome and any associated award for a play of a game. In these embodiments, the game server is configured to communicate with the personal gaming device and the payment device, and the personal gaming device and the payment device are not configured to directly communicate with one another. In these embodiments, when the game server receives data representing a request to start a play of a game at a desired wager, the game server sends data representing the desired wager to the payment server. The payment server determines whether the player's account balance can cover the desired wager (i.e., includes a monetary balance at least equal to the desired wager).

If the payment server determines that the player's account balance cannot cover the desired wager, the payment server notifies the game server, which then instructs the personal gaming device to display a suitable notification to the player that the player's account balance is too low to place the desired wager. If the payment server determines that the player's account balance can cover the desired wager, the payment server deducts the desired wager from the account balance and notifies the game server. The game server then determines an outcome and any associated award for the play of the game. The game server notifies the payment server of any nonzero award, and the payment server increases the player's account balance by the nonzero award. The game server sends data representing the outcome and any award to the personal gaming device, which displays the outcome and any award.

In certain embodiments, the one or more servers enable web-based game play using a personal gaming device only if the personal gaming device satisfies one or more jurisdictional requirements. In one embodiment, the one or more servers enable web-based game play using the personal gaming device only if the personal gaming device is located within a designated geographic area (such as within certain state or county lines or within the boundaries of a gaming establishment). In this embodiment, the geolocation module of the personal gaming device determines the location of the personal gaming device and sends the location to the one or more servers, which determine whether the personal gaming device is located within the designated geographic area. In various embodiments, the one or more servers enable non-monetary wager-based game play if the personal gaming device is located outside of the designated geographic area.

In various embodiments, the gaming system includes an EGM configured to communicate with a personal gaming device—such as a smartphone, a tablet computer, a desktop computer, or a laptop computer—to enable tethered mobile game play using the personal gaming device. Generally, in these embodiments, the EGM establishes communication with the personal gaming device and enables the player to play games on the EGM remotely via the personal gaming device. In certain embodiments, the gaming system includes a geo-fence system that enables tethered game play within a particular geographic area but not outside of that geographic area. Examples of tethering an EGM to a personal gaming device and geo-fencing are described in U.S. Patent Appl. Pub. No. 2013/0267324, entitled "Remote Gaming Method Allowing Temporary Inactivation Without Terminating Playing Session Due to Game Inactivity".

Social Network Integration

In certain embodiments, the gaming system is configured to communicate with a social network server that hosts or partially hosts a social networking website via a data network (such as the Internet) to integrate a player's gaming experience with the player's social networking account. This enables the gaming system to send certain information to the social network server that the social network server can use to create content (such as text, an image, and/or a video) and post it to the player's wall, newsfeed, or similar area of the social networking website accessible by the player's connections (and in certain cases the public) such that the player's connections can view that information. This also enables the gaming system to receive certain information from the social network server, such as the player's likes or dislikes or the player's list of connections. In certain embodiments, the gaming system enables the player to link the player's player account to the player's social networking account(s). This enables the gaming system to, once it identifies the player and initiates a gaming session (such as via the player logging in to a website (or an application) on the player's personal gaming device or via the player inserting the player's player tracking card into an EGM), link that gaming session to the player's social networking account(s). In other embodiments, the gaming system enables the player to link the player's social networking account(s) to individual gaming sessions when desired by providing the required login information.

For instance, in one embodiment, if a player wins a particular award (e.g., a progressive award or a jackpot award) or an award that exceeds a certain threshold (e.g., an award exceeding $1,000), the gaming system sends information about the award to the social network server to enable the server to create associated content (such as a screenshot of the outcome and associated award) and to post that content to the player's wall (or other suitable area) of the social networking website for the player's connections to see (and to entice them to play). In another embodiment, if a player joins a multiplayer game and there is another seat available, the gaming system sends that information to the social network sever to enable the server to create associated content (such as text indicating a vacancy for that particular game) and to post that content to the player's wall (or other suitable area) of the social networking website for the player's connections to see (and to entice them to fill the vacancy). In another embodiment, if the player consents, the gaming system sends advertisement information or offer information to the social network server to enable the social network server to create associated content (such as text or an image reflecting an advertisement and/or an offer) and to post that content to the player's wall (or other suitable area) of the social networking website for the player's connections to see. In another embodiment, the gaming system enables the player to recommend a game to the player's connections by posting a recommendation to the player's wall (or other suitable area) of the social networking website.

Differentiating Certain Gaming Systems from General Purpose Computing Devices Certain of the gaming systems described herein, such as EGMs located in a casino or another gaming establishment, include certain components and/or are configured to operate in certain manners that differentiate these systems from general purpose computing devices, i.e., certain personal gaming devices such as desktop computers and laptop computers.

For instance, EGMs are highly regulated to ensure fairness and, in many cases, EGMs are configured to award monetary awards up to multiple millions of dollars. To satisfy security and regulatory requirements in a gaming environment, hardware and/or software architectures are implemented in EGMs that differ significantly from those of general purpose computing devices. For purposes of illustration, a description of EGMs relative to general purpose computing devices and some examples of these additional (or different) hardware and/or software architectures found in EGMs are described below.

At first glance, one might think that adapting general purpose computing device technologies to the gaming industry and EGMs would be a simple proposition because both general purpose computing devices and EGMs employ processors that control a variety of devices. However, due to at least: (1) the regulatory requirements placed on EGMs, (2) the harsh environment in which EGMs operate, (3) security requirements, and (4) fault tolerance requirements, adapting general purpose computing device technologies to EGMs can be quite difficult. Further, techniques and methods for solving a problem in the general purpose computing device industry, such as device compatibility and connectivity issues, might not be adequate in the gaming industry. For instance, a fault or a weakness tolerated in a general purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below. A first difference between EGMs and general purpose computing devices is that EGMs are state-based systems. A state-based system stores and maintains its current state in a non-volatile memory such that, in the event of a power failure or other malfunction, the state-based system can return to that state when the power is restored or the malfunction is remedied. For instance, for a state-based EGM, if the EGM displays an award for a game of chance but the power to the EGM fails before the EGM provides the award to the player, the EGM stores the pre-power failure state in a non-volatile memory, returns to that state upon restoration of power, and provides the award to the player. This requirement affects the software and hardware design on EGMs. General purpose computing devices are not state-based machines, and a majority of data is usually lost when a malfunction occurs on a general purpose computing device.

A second difference between EGMs and general purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a player of an EGM from manipulating the EGM's hardware and software in a manner that gives him an unfair, and in some cases illegal, advantage.

A third difference between EGMs and general purpose computing devices is authentication—EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code. Examples of EGM code authentication are described in U.S. Pat. No. 6,962,530, entitled "Authentication in a Secure Computerized Gaming System"; U.S. Pat. No. 7,043,641, entitled "Encryption in a Secure Computerized Gaming System"; U.S. Pat. No. 7,201,662, entitled "Method and Apparatus for Software Authentication"; and U.S. Pat. No. 8,627,097, entitled "System and Method Enabling Parallel Processing of Hash Functions Using Authentication Checkpoint Hashes".

A fourth difference between EGMs and general purpose computing devices is that EGMs have unique peripheral device requirements that differ from those of a general purpose computing device, such as peripheral device security requirements not usually addressed by general purpose computing devices. For instance, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally-operating EGM, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry. These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the player's wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just before the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum amount of time for which sufficient power may be available to the various EGM components after a power outage event has occurred at the EGM.

As described previously, the EGM may not advance from a first state to a second state until critical information that enables the first state to be reconstructed has been atomically stored. After the state of the EGM is restored during the play of a game of chance, game play may resume and the game may be completed in a manner that is no different than if the malfunction had not occurred. Thus, for example, when a malfunction occurs during a game of chance, the EGM may be restored to a state in the game of chance just before when the malfunction occurred. The restored state may include metering information and graphical information that was displayed on the EGM in the state before the malfunction. For example, when the malfunction occurs during the play of a card game after the cards have been dealt, the EGM may be restored with the cards that were previously displayed as part of the card game. As another example, a bonus game may be triggered during the play of a game of chance in which a player is required to make a number of selections on a video display screen. When a malfunction has occurred after the player has made one or more selections, the EGM may be restored to a state that shows the graphical presentation just before the malfunction including an indication of selections that have already been made by the player. In general, the EGM may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device. The information stored in the non-volatile memory may be detailed enough to reconstruct a portion of the graphical presentation that was previously presented on the EGM and the state of the EGM (e.g., credits) at the time the game of chance was played. The game history information may be utilized in the event of a dispute. For example, a player may decide that in a previous game of chance that they did not receive credit for an award that they believed they won. The game history information may be used to reconstruct the state of the EGM before, during, and/or after the disputed game to demonstrate whether the player was correct or not in the player's assertion. Examples of a state-based EGM, recovery from malfunctions, and game history are described in U.S. Pat. No. 6,804,763, entitled "High Performance Battery Backed RAM Interface"; U.S. Pat. No. 6,863,608, entitled "Frame Capture of Actual Game Play"; U.S. Pat. No. 7,111,141, entitled "Dynamic NV-RAM"; and U.S. Pat. No. 7,384,339, entitled, "Frame Capture of Actual Game Play".

Another feature of EGMs is that they often include unique interfaces, including serial interfaces, to connect to specific subsystems internal and external to the EGM. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between EGMs. As another example, SAS is a communication protocol used to transmit information, such as metering information, from an EGM to a remote device. Often SAS is used in conjunction with a player tracking system.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power-off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM. The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents is a separate third party verification device. Once the trusted memory device is verified as authentic, and based on the approval of the verification algorithms included in the trusted device, the EGM is enabled to verify the authenticity of additional code and data that may be located in the gaming computer assembly, such as code and data stored on hard disk drives. Examples of trusted memory devices are described in U.S. Pat. No. 6,685,567, entitled "Process Verification".

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected. Examples of trusted memory devices/sources are described in U.S. Pat. No. 7,515,718, entitled "Secured Virtual Network in a Gaming Environment".

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present. Examples of using a mass storage device are described in U.S. Pat. No. 6,149,522, entitled "Method of Authenticating Game Data Sets in an Electronic Casino Gaming System".

It should be appreciated that the terminology used herein is for the purpose of describing particular aspects only and is not intended to be limiting of the disclosure. For example, the singular forms "a", "an" and "the" are intended to include the plural forms as well, unless the context clearly indicates otherwise. In another example, the terms "including" and "comprising" and variations thereof, when used in this specification, specify the presence of stated features, steps, operations, elements, and/or components, but do not preclude the presence or addition of one or more other features, steps, operations, elements, components, and/or groups thereof. Additionally, a listing of items does not imply that any or all of the items are mutually exclusive nor does a listing of items imply that any or all of the items are collectively exhaustive of anything or in a particular order, unless expressly specified otherwise. Moreover, as used herein, the term "and/or" includes any and all combinations of one or more of the associated listed items. It should be further appreciated that headings of sections provided in this document and the titles are for convenience only, and are not to be taken as limiting the disclosure in any way. Furthermore, unless expressly specified otherwise, devices that are in communication with each other need not be in continuous communication with each other and may communicate directly or indirectly through one or more intermediaries.

Various changes and modifications to the present embodiments described herein will be apparent to those skilled in the art. For example, a description of an embodiment with several components in communication with each other does not imply that all such components are required, or that each of the disclosed components must communicate with every other component. On the contrary a variety of optional components are described to illustrate the wide variety of possible embodiments of the present disclosure. As such, these changes and modifications can be made without departing from the spirit and scope of the present subject matter and without diminishing its intended technical scope. It is therefore intended that such changes and modifications be covered by the appended claims.

The invention claimed is:

1. A gaming system comprising:

a processor; and a memory device that stores a plurality of instructions, that when executed by the processor, cause the processor to:

communicate data that results in a display, by a display device, of a first digit set comprising multiple digits;

communicate data that results in a display, by the display device, of a first lock covering a first one of the digits of the first digit set;

responsive to an occurrence of a first lock movement event, communicate data that results in a display, by the display device, of the first lock uncovering the first one of the digits of the first digit set, the first lock moving from the first one of the digits of the first digit set to a second one of the digits of the first digit set, and the first lock covering the second one of the digits of the first digit set; and responsive to an occurrence of a first digit set triggering event, communicate data that results in a display, by the display device, of a digit set based on the digits of the first digit set that are not covered by the first lock at a time of the occurrence of the first digit set triggering event.

2. The gaming system of claim 1, wherein the first lock movement event is associated with a direction of movement of the first lock.

3. The gaming system of claim 1, wherein when executed by the processor, the instructions cause the processor to:

communicate data that results in a display, by the display device, of a second digit set comprising multiple digits, communicate data that results in a display, by the display device, of a second lock covering a first one of the digits of the second digit set, and responsive to the occurrence of the first lock movement event, communicate data that results in a display, by the display device, of the second lock uncovering the first one of the digits of the second digit set, the second lock moving from the first one of the digits of the second digit set to a second one of the digits of the second digit set, and the second lock covering the second one of the digits of the second digit set.

4. The gaming system of claim 1, wherein when executed by the processor, the instructions cause the processor to:

communicate data that results in a display, by the display device, of a second digit set comprising multiple digits, communicate data that results in a display, by the display device, of a second lock covering a first one of the digits of the second digit set, and responsive to an occurrence of a second lock movement event, communicate data that results in a display, by the display device, of the second lock uncovering the first one of the digits of the second digit set, the second lock moving from the first one of the digits of the second digit set to a second one of the digits of the second digit set, and the second lock covering the second one of the digits of the second digit set.

5. The gaming system of claim 1, wherein when executed by the processor, the instructions cause the processor to, responsive to an occurrence of a digit change event, communicate data that results in a display, by the display device, of a change to one of the digits of the first digit set not covered by the first lock.

6. The gaming system of claim 1, wherein when executed by the processor, the instructions cause the processor to, responsive to an occurrence of a digit change event, communicate data that results in a display, by the display device, of changes to all of the digits of the first digit set that are not covered by any lock.

7. The gaming system of claim 1, wherein when executed by the processor, the instructions cause the processor to prevent the first lock from ever covering one of the digits of the digit set.

8. The gaming system of claim 1, wherein the occurrence of the first lock movement event is based on a random determination for a play of a game.

9. The gaming system of claim 1, wherein the occurrence of the first digit set triggering event is based on a random determination for a play of a game.

10. The gaming system of claim 1, wherein the first digit set is a progressive digit set wherein the digits of the digit set are changeable.

11. A gaming system comprising:

a processor; and a memory device that stores a plurality of instructions, that when executed by the processor, cause the processor to:

communicate data that results in a display, by a display device, of a first digit set and a second digit set, each of the first digit set and the second digit set comprising multiple digits;

communicate data that results in a display, by the display device, of a first lock covering a first one of the digits of the first digit set and a second lock covering a first one of the digits of the second digit set;

responsive to an occurrence of a lock movement event, communicate data that results in a display, by the display device, of (i) the first lock uncovering the first one of the digits of the first digit set and the first lock covering a second one of the digits of the first digit set, and (ii) the second lock uncovering the first one of the digits of the second digit set and the second lock covering a second one of the digits of the second digit set; and responsive to an occurrence of a digit set triggering event, communicate data that results in a display, by the display device, of a digit set based on at least one of (i) the digits of the first digit set that are not covered by the first lock at a time of the occurrence of the digit set triggering event, and (ii) the digits of the second digit set that are not covered by the second lock at a time of the occurrence of the digit set triggering event.

12. The gaming system of claim 11, wherein when executed by the processor, the instructions cause the processor to, responsive to an occurrence of a digit change triggering event, communicate data that results in a display, by the display device, of (i) one of the digits of the first digit set not covered by the first lock changing, and (ii) one of the digits of the second digit set not covered by the second lock changing.

13. The gaming system of claim 11, wherein the occurrence of the lock movement event is based on a random determination for a play of a game.

14. The gaming system of claim 11, wherein the occurrence of the digit set triggering event is based on a random determination for a play of a game.

15. The gaming system of claim 11, wherein when executed by the processor, the instructions cause the processor to, responsive to the occurrence of the lock movement event, communicate data that results in a display, by the display device, of the first lock moving in a first direction and the second lock moving in a second direction that is different than the first direction.

16. A gaming system comprising:

a processor; and a memory device that stores a plurality of instructions, that when executed by the processor, cause the processor to:

communicate data that results in a display, by a display device, of a first digit set comprising multiple digits;

after communicating data that results in a display, by the display device, of an occurrence of a first lock placement event, communicate data that results in a display, by the display device, of a first lock covering a first one of the digits of the first digit set;

after communicating data that results in a display, by the display device, of an occurrence of a first lock movement event, communicate data that results in a display, by the display device, of the first lock uncovering the first one of the digits of the first digit set, the first lock moving from the first one of the digits of the first digit set to a second one of the digits of the first digit set, and the first lock covering the second one of the digits of the first digit set; and thereafter, after communicating data that results in a display, by the display device, of an occurrence of a first digit set triggering event, communicate data that results in a display, by the display device, of a digit set based on the digits of the first digit set that are not covered by the first lock at a time of the occurrence of the first digit set triggering event.

17. The gaming system of claim 16, wherein when executed by the processor, the instructions cause the processor, responsive to an occurrence of a digit change event, communicate data that results in a display, by the display device, of a change to one of the digits of the first digit set not covered by the first lock.

18. The gaming system of claim 16, wherein the occurrence of the first lock placement event is based on a random determination for a play of a game.

19. The gaming system of claim 16, wherein the first digit set is a progressive digit set wherein the digits of the digit set are changeable.

* * * * *